(12) United States Patent
Cerny et al.

(10) Patent No.: US 11,599,967 B2
(45) Date of Patent: Mar. 7, 2023

(54) GENERATING HINTS OF OBJECT OVERLAP BY REGION TESTING WHILE RENDERING FOR EFFICIENT MULTI-GPU RENDERING OF GEOMETRY

(71) Applicant: Sony Interactive Entertainment Inc., Tokyo (JP)

(72) Inventors: Mark E. Cerny, Los Angeles, CA (US); Florian Strauss, San Mateo, CA (US); Tobias Berghoff, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/730,155

(22) Filed: Apr. 26, 2022

(65) Prior Publication Data

US 2022/0253968 A1    Aug. 11, 2022

Related U.S. Application Data

(63) Continuation of application No. 16/780,566, filed on Feb. 3, 2020, now Pat. No. 11,321,800.

(51) Int. Cl.
*G06T 1/20* (2006.01)

(52) U.S. Cl.
CPC .................................... *G06T 1/20* (2013.01)

(58) Field of Classification Search
None
See application file for complete search history.

(56) References Cited

U.S. PATENT DOCUMENTS 9,524,138 B2 * 12/2016 Boucher ................... G06T 1/20

* cited by examiner

*Primary Examiner* — Nicholas R Wilson
(74) *Attorney, Agent, or Firm* — Penilla IP, APC

(57) ABSTRACT

A method for graphics processing. The method including rendering graphics for an application using a plurality of graphics processing units (GPUs). The method including dividing responsibility for the rendering geometry of the graphics between the plurality of GPUs based on a plurality of screen regions, each GPU having a corresponding division of the responsibility which is known to the plurality of GPUs. The method including generating information regarding a piece of geometry with respect to a first screen region for which a first GPU has a first division of responsibility, while rendering the piece of geometry at a second GPU for an image. The method including rendering the piece of geometry at the first GPU using the information.

20 Claims, 14 Drawing Sheets

| GPU | Object Responsibility | | | |
|---|---|---|---|---|
| | Object 0 | Object 1 | Object 2 | Object 3 |
| GPU A | -- | -- | X | -- |
| GPU B | X | -- | X | X |
| GPU C | -- | X | -- | X |
| GPU D | -- | X | X | X |

FIG. 9A

| A | B | A | B | A | B | A |
|---|---|---|---|---|---|---|
| C | D | C | D | C | D | C |
| A | B | A | B | A | B | A |
| C | D | C | D | C | D | C |

FIG. 9B

| A | B | C | D | A | B | C |
|---|---|---|---|---|---|---|
| C | D | A | B | C | D | A |
| B | A | D | C | B | A | D |
| D | C | B | A | D | C | B |

FIG. 9C

| A | B | C | D | A | B | C | D |
|---|---|---|---|---|---|---|---|
| C | D | A | B | C | D | A | B |
| B | A | D | C | B | A | D | C |
| D | C | B | A | D | C | B | A |

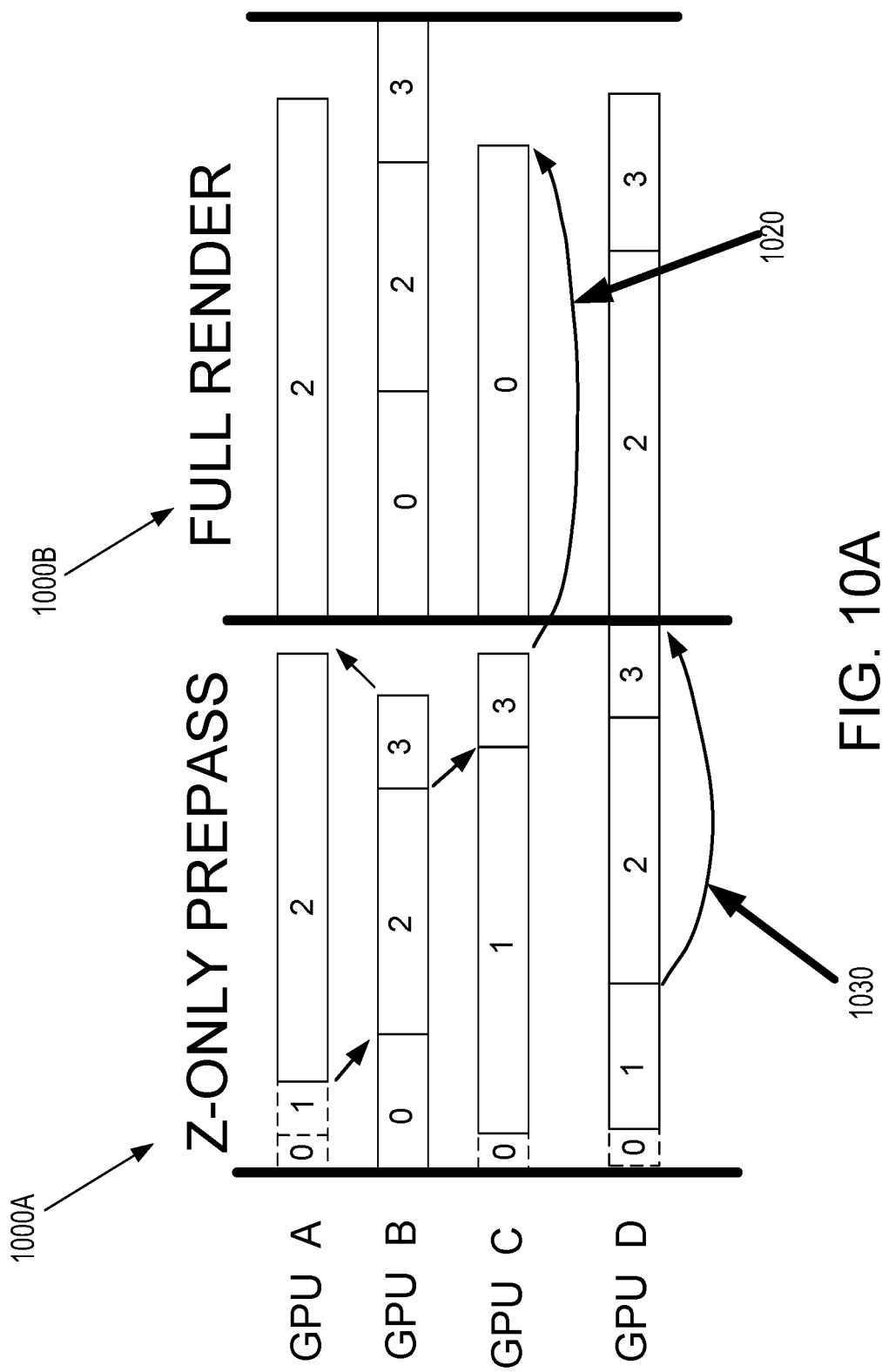

GENERATING HINTS OF OBJECT OVERLAP BY REGION TESTING WHILE RENDERING FOR EFFICIENT MULTI-GPU RENDERING OF GEOMETRY

CLAIM OF PRIORITY

This application is a continuation of and claims priority to and the benefit of commonly owned, patent application U.S. Ser. No. 16/780,566, filed on Feb. 3, 2020, entitled "System And Method For Efficient Multi-GPU Rendering Of Geometry By Region Testing While Rendering," the disclosure of which is incorporated herein in its entirety for all purposes.

CROSS REFERENCE TO RELATED APPLICATIONS

This application is related to commonly assigned, co-pending U.S. patent application Ser. No. 16/780,605, entitled "SYSTEM AND METHOD FOR EFFICIENT MULTI-GPU RENDERING OF GEOMETRY BY GENERATING INFORMATION IN ONE RENDERING PHASE FOR USE IN ANOTHER RENDERING PHASE," filed concurrently with the present application, the disclosure of which is hereby incorporated by reference in its entirety.

TECHNICAL FIELD

The present disclosure is related to graphic processing, and more specifically for multi-GPU collaboration when rendering an image for an application.

BACKGROUND OF THE DISCLOSURE

In recent years there has been a continual push for online services that allow for online or cloud gaming in a streaming format between a cloud gaming server and a client connected through a network. The streaming format has increasingly become more popular because of the availability of game titles on demand, the ability to execute more complex games, the ability to network between players for multi-player gaming, sharing of assets between players, sharing of instant experiences between players and/or spectators, allowing friends to watch a friend play a video game, having a friend join the on-going game play of a friend, and the like.

The cloud gaming server may be configured to provide resources to one or more clients and/or applications. That is, the cloud gaming server may be configured with resources capable of high throughput. For example, there are limits to the performance that an individual graphics processing unit (GPU) can attain. To render even more complex scenes or use even more complex algorithms (e.g. materials, lighting, etc.) when generating a scene, it may be desirable to use multiple GPUs to render a single image. However, usage of those graphics processing units equally is difficult to achieve. Further, even though there are multiple GPUs to process an image for an application using traditional technologies, there is not the ability to support a corresponding increase in both screen pixel count and density of geometry (e.g., four GPUs cannot write four times the pixels and/or process four times the vertices or primitives for an image).

It is in this context that embodiments of the disclosure arise.

SUMMARY

Embodiments of the present disclosure relate to using multiple GPUs in collaboration to render a single image, such as multi-GPU rendering of geometry for an application by region testing while rendering.

Embodiments of the present disclosure disclose a method for graphics processing. The method includes rendering graphics for an application using a plurality of graphics processing units (GPUs). The method includes dividing responsibility for the rendering geometry of the graphics between the plurality of GPUs based on a plurality of screen regions, each GPU having a corresponding division of the responsibility which is known to the plurality of GPUs. The method includes while rendering a piece of geometry at a second GPU for an image, generating information regarding the piece of geometry with respect to a first screen region for which a first GPU has a first division of responsibility. The method includes rendering the piece of geometry at the first GPU using the information.

Other embodiments of the present disclosure disclose a non-transitory computer-readable medium for performing a method. The computer-readable medium including program instructions for rendering graphics for an application using a plurality of graphics processing units (GPUs). The computer-readable medium including program instructions for dividing responsibility for the rendering geometry of the graphics between the plurality of GPUs based on a plurality of screen regions, each GPU having a corresponding division of the responsibility which is known to the plurality of GPUs. The computer-readable medium including program instructions for generating information regarding a piece of geometry with respect to a first screen region for which a first GPU has a first division of responsibility, while rendering the piece of geometry at a second GPU for an image. The computer-readable medium including program instructions for rendering the piece of geometry at the first GPU using the information.

Still other embodiments of the present disclosure disclose a computer system including a processor and memory coupled to the processor and having stored therein instructions that, if executed by the computer system, cause the computer system to execute a method. The method including rendering graphics for an application using a plurality of graphics processing units (GPUs). The method including dividing responsibility for the rendering geometry of the graphics between the plurality of GPUs based on a plurality of screen regions, each GPU having a corresponding division of the responsibility which is known to the plurality of GPUs. The method including while rendering a piece of geometry at a second GPU for an image, generating information regarding the piece of geometry with respect to a first screen region for which a first GPU has a first division of responsibility. The method including rendering the piece of geometry at the first GPU using the information.

Embodiments of the present disclosure disclose a method for graphics processing. The method including rendering graphics for an application using a plurality of graphics processing units (GPUs). The method including dividing responsibility for rendering geometry of the graphics between the GPUs based on screen regions, each GPU having a corresponding division of the responsibility which is known to the GPUs. The method including determining a Z-value for a piece of geometry during a pre-pass phase of rendering at a first GPU for an image, wherein the piece of geometry overlaps a first screen region for which the first GPU has a division of responsibility. The method including comparing the Z-value against a Z-buffer value for the piece of geometry. The method including generating information including a result of the comparing the Z-value against the Z-buffer value for use by the GPU when rendering the piece of geometry during a full render phase of rendering.

Other embodiments of the present disclosure disclose a non-transitory computer-readable medium for performing a method. The computer-readable medium including program instructions for rendering graphics for an application using a plurality of graphics processing units (GPUs). The computer-readable medium including program instructions for dividing responsibility for rendering geometry of the graphics between the GPUs based on screen regions, each GPU having a corresponding division of the responsibility which is known to the GPUs. The computer-readable medium including program instructions for determining a Z-value for a piece of geometry during a pre-pass phase of rendering at a first GPU for an image, wherein the piece of geometry overlaps a first screen region for which the first GPU has a division of responsibility. The computer-readable medium including program instructions for comparing the Z-value against a Z-buffer value for the piece of geometry. The computer-readable medium including program instructions for generating information including a result of the comparing the Z-value against the Z-buffer value for use by the GPU when rendering the piece of geometry during a full render phase of rendering.

Still other embodiments of the present disclosure disclose a computer system including a processor and memory coupled to the processor and having stored therein instructions that, if executed by the computer system, cause the computer system to execute a method. The method including rendering graphics for an application using a plurality of graphics processing units (GPUs). The method including dividing responsibility for rendering geometry of the graphics between the GPUs based on screen regions, each GPU having a corresponding division of the responsibility which is known to the GPUs. The method including determining a Z-value for a piece of geometry during a pre-pass phase of rendering at a first GPU for an image, wherein the piece of geometry overlaps a first screen region for which the first GPU has a division of responsibility. The method including comparing the Z-value against a Z-buffer value for the piece of geometry. The method including generating information including a result of the comparing the Z-value against the Z-buffer value for use by the GPU when rendering the piece of geometry during a full render phase of rendering.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 7B-1 illustrates an image including four objects rendered by multiple GPUs, and shows the screen region responsibilities for each GPU when rendering the objects of the image, in accordance with one embodiment of the present disclosure.

FIG. 7B-2 is a table illustrating the rendering performed by each GPU when rendering the four objects of FIG. 7B-1, in accordance with one embodiment of the present disclosure.

FIGS. 9A-9C illustrates various strategies for assigning screen regions to corresponding GPUs when multiple GPUs collaborate to render a single image, in accordance with one embodiment of the present disclosure.

FIG. 10A is a diagram illustrating multi-pass rendering when performing multi-GPU rendering of geometry for an application by region testing while rendering, in accordance with one embodiment of the present disclosure.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, there are limits to the performance that an individual GPU can attain, e.g. deriving from the limits on how large the GPU can be. To render even more complex scenes or use even more complex algorithms (e.g. materials, lighting, etc.) it is desirable to use multiple GPUs to render a single image, in embodiments of the present disclosure. In particular, various embodiments of the present disclosure describe methods and systems configured for performing multi-GPU rendering of geometry for an application by region testing while rendering. Specifically, a plurality of GPUs collaborate to generate an image of an application. Responsibility for rendering graphics of the application is divided between the plurality of the GPUs based on corresponding screen regions. While rendering geometry for the image, each of the plurality of GPUs generate information regarding the geometry and its relation to the screen regions for which other GPUs may be responsible; this information allows the other GPUs to more efficiently render the geometry or avoid rendering it altogether. As an advantage, for example this allows the multiple GPUs to render more complex scenes and/or images in the same amount of time.

With the above general understanding of the various embodiments, example details of the embodiments will now be described with reference to the various drawings.

Throughout the specification, the reference to "application" or "game" or "video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

Throughout the specification, various embodiments of the present disclosure are described for multi-GPU processing or rendering of geometry for an application using an exemplary architecture having four GPUs. However, it is understood that any number of GPUs (e.g., two or more GPUs) may collaborate when rendering geometry for an application.

Figure 1:
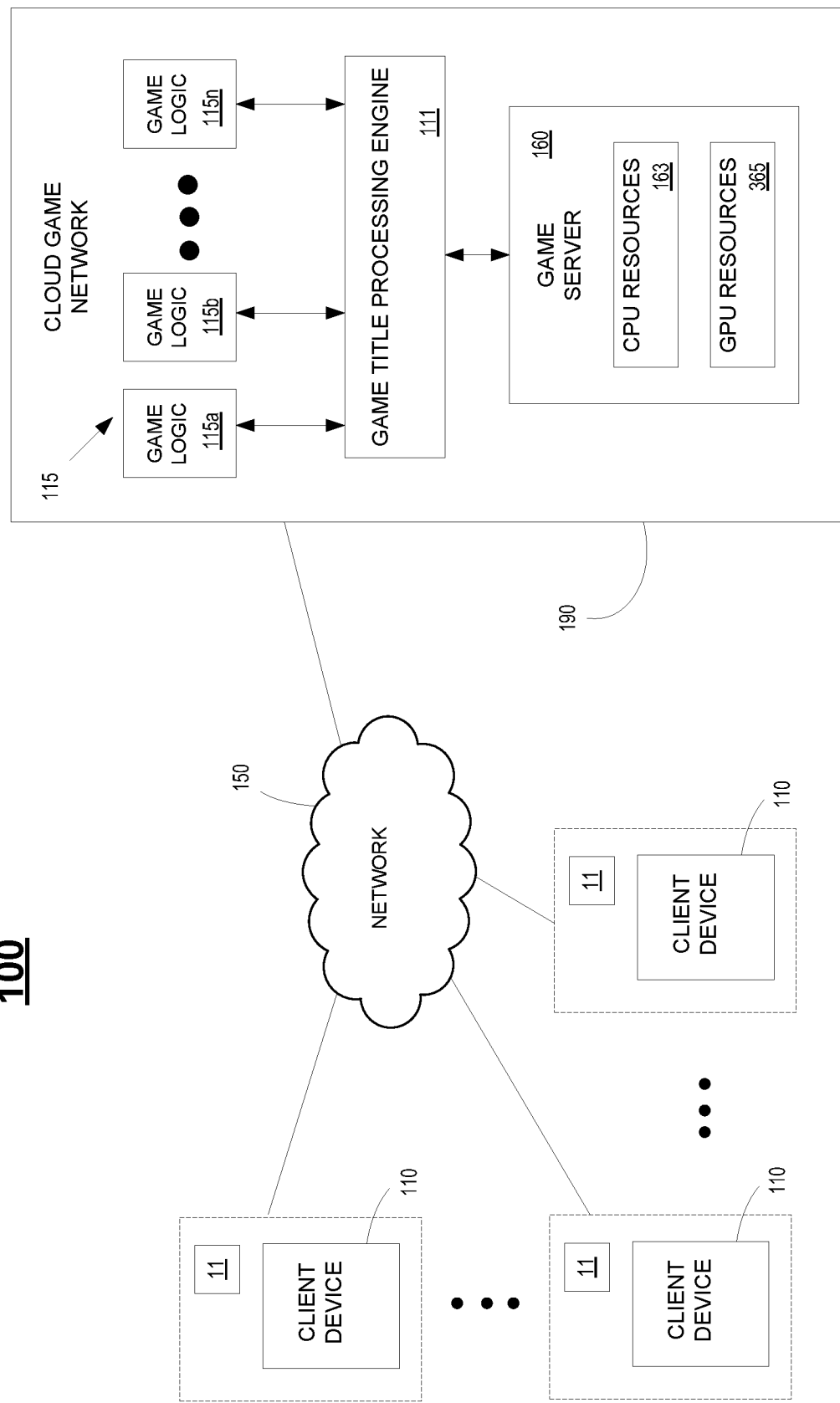
FIG. 1 is a diagram of a system for providing gaming over a network between one or more cloud gaming servers configured for implementing multiple GPUs in collaboration to render a single image, including multi-GPU (graphics processing unit) rendering of geometry for an application by region testing while rendering, in accordance with one embodiment of the present disclosure.

FIG. 1 is a diagram of a system for performing multi-GPU processing when rendering an image for an application, in accordance with one embodiment of the present disclosure. The system is configured to provide gaming over a network between one or more cloud gaming servers, and more specifically is configured for the collaboration of multiple GPUs to render a single image of an application, in accordance with embodiments of the present disclosure. Cloud gaming includes the execution of a video game at the server to generate game rendered video frames, which are then sent to a client for display. In particular, system 100 is configured for efficient multi-GPU rendering of geometry for an application by region testing while rendering.

Although FIG. 1 illustrates the implementation of multi-GPU rendering of geometry between one or more cloud gaming servers of a cloud gaming system, other embodiments of the present disclosure provide for efficient multi-GPU rendering of geometry for an application by performing region testing while rendering within a stand-alone system, such as a personal computer or gaming console that includes a high-end graphics card having multiple GPUs.

It is also understood that the multi-GPU rendering of geometry may be performed using physical GPUs, or virtual GPUs, or a combination of both, in various embodiments (e.g. in a cloud gaming environment or within a stand-alone system). For example, virtual machines (e.g. instances) may be created using a hypervisor of a host hardware (e.g. located at a data center) utilizing one or more components of a hardware layer, such as multiple CPUs, memory modules, GPUs, network interfaces, communication components, etc. These physical resources may be arranged in racks, such as racks of CPUs, racks of GPUs, racks of memory, etc., wherein the physical resources in the racks may be accessed using top of rack switches facilitating a fabric for assembling and accessing of components used for an instance (e.g. when building the virtualized components of the instance). Generally, a hypervisor can present multiple guest operating systems of multiple instances that are configured with virtual resources. That is, each of the operating systems may be configured with a corresponding set of virtualized resources supported by one or more hardware resources (e.g. located at a corresponding data center). For instance, each operating system may be supported with a virtual CPU, multiple virtual GPUs, virtual memory, virtualized communication components, etc. In addition, a configuration of an instance that may be transferred from one data center to another data center to reduce latency. GPU utilization defined for the user or game can be utilized when saving a user's gaming session. The GPU utilization can include any number of configurations described herein to optimize the fast rendering of video frames for a gaming session. In one embodiment, the GPU utilization defined for the game or the user can be transferred between data centers as a configurable setting. The ability to transfer the GPU utilization setting enables for efficient migration of game play from data center to data center in case the user connects to play games from different geo locations.

System 100 provides gaming via a cloud game network 190, wherein the game is being executed remote from client device 110 (e.g. thin client) of a corresponding user that is playing the game, in accordance with one embodiment of the present disclosure. System 100 may provide gaming control to one or more users playing one or more games through the cloud game network 190 via network 150 in either single-player or multi-player modes. In some embodiments, the cloud game network 190 may include a plurality of virtual machines (VMs) running on a hypervisor of a host machine, with one or more virtual machines configured to execute a game processor module utilizing the hardware resources available to the hypervisor of the host. Network 150 may include one or more communication technologies. In some embodiments, network 150 may include 5$^{th}$ Generation (5G) network technology having advanced wireless communication systems.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

As shown, the cloud game network 190 includes a game server 160 that provides access to a plurality of video games. Game server 160 may be any type of server computing device available in the cloud, and may be configured as one or more virtual machines executing on one or more hosts. For example, game server 160 may manage a virtual machine supporting a game processor that instantiates an instance of a game for a user. As such, a plurality of game processors of game server 160 associated with a plurality of virtual machines is configured to execute multiple instances of one or more games associated with gameplays of a plurality of users. In that manner, back-end server support provides streaming of media (e.g. video, audio, etc.) of gameplays of a plurality of gaming applications to a plurality of corresponding users. That is, game server 160 is configured to stream data (e.g. rendered images and/or frames of a corresponding gameplay) back to a corresponding client device 110 through network 150. In that manner, a computationally complex gaming application may be executing at the back-end server in response to controller inputs received and forwarded by client device 110. Each server is able to render images and/or frames that are then encoded (e.g. compressed) and streamed to the corresponding client device for display.

For example, a plurality of users may access cloud game network 190 via communication network 150 using corresponding client devices 110 configured for receiving streaming media. In one embodiment, client device 110 may be configured as a thin client providing interfacing with a back end server (e.g. cloud game network 190) configured for providing computational functionality (e.g. including game title processing engine 111). In another embodiment, client device 110 may be configured with a game title processing engine and game logic for at least some local processing of a video game, and may be further utilized for receiving streaming content as generated by the video game executing at a back-end server, or for other content provided by back-end server support. For local processing, the game title processing engine includes basic processor based functions for executing a video game and services associated with the video game. In that case, the game logic may be stored on the local client device 110 and is used for executing the video game.

Each of the client devices 110 may be requesting access to different games from the cloud game network. For example, cloud game network 190 may be executing one or more game logics that are built upon a game title processing engine 111, as executed using the CPU resources 163 and GPU resources 365 of the game server 160. For instance, game logic 115a in cooperation with game title processing engine 111 may be executing on game server 160 for one client, game logic 115b in cooperation with game title processing engine 111 may be executing on game server 160 for a second client, . . . and game logic 115n in cooperation with game title processing engine 111 may be executing on game server 160 for an Nth client.

In particular, client device 110 of a corresponding user (not shown) is configured for requesting access to games over a communication network 150, such as the internet, and for rendering for display images generated by a video game executed by the game server 160, wherein encoded images are delivered to the client device 110 for display in association with the corresponding user. For example, the user may be interacting through client device 110 with an instance of a video game executing on game processor of game server 160. More particularly, an instance of the video game is executed by the game title processing engine 111. Corresponding game logic (e.g. executable code) 115 implementing the video game is stored and accessible through a data store (not shown), and is used to execute the video game. Game title processing engine 111 is able to support a plurality of video games using a plurality of game logics (e.g. gaming application), each of which is selectable by the user.

For example, client device 110 is configured to interact with the game title processing engine 111 in association with the gameplay of a corresponding user, such as through input commands that are used to drive gameplay. In particular, client device 110 may receive input from various types of input devices, such as game controllers, tablet computers, keyboards, gestures captured by video cameras, mice, touch pads, etc. Client device 110 can be any type of computing device having at least a memory and a processor module that is capable of connecting to the game server 160 over network 150. The back-end game title processing engine 111 is configured for generating rendered images, which is delivered over network 150 for display at a corresponding display in association with client device 110. For example, through cloud based services the game rendered images may be delivered by an instance of a corresponding game (e.g. game logic) executing on game executing engine 111 of game server 160. That is, client device 110 is configured for receiving encoded images (e.g. encoded from game rendered images generated through execution of a video game), and for displaying the images that are rendered on display 11. In one embodiment, display 11 includes an HMD (e.g. displaying VR content). In some embodiments, the rendered images may be streamed to a smartphone or tablet, wirelessly or wired, direct from the cloud based services or via the client device 110 (e.g. PlayStation® Remote Play).

In one embodiment, game server 160 and/or the game title processing engine 111 includes basic processor based functions for executing the game and services associated with the gaming application. For example, game server 160 includes central processing unit (CPU) resources 163 and graphics processing unit (GPU) resources 365 that are configured for performing processor based functions include 2D or 3D rendering, physics simulation, scripting, audio, animation, graphics processing, lighting, shading, rasterization, ray tracing, shadowing, culling, transformation, artificial intelligence, etc. In addition, the CPU and GPU group may implement services for the gaming application, including, in part, memory management, multi-thread management, quality of service (QoS), bandwidth testing, social networking, management of social friends, communication with social networks of friends, communication channels, texting, instant messaging, chat support, etc. In one embodiment, one or more applications share a particular GPU resource. In one embodiment, multiple GPU devices may be combined to perform graphics processing for a single application that is executing on a corresponding CPU.

In one embodiment, cloud game network 190 is a distributed game server system and/or architecture. In particular, a distributed game engine executing game logic is configured as a corresponding instance of a corresponding game. In general, the distributed game engine takes each of the functions of a game engine and distributes those functions for execution by a multitude of processing entities. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the cloud game network 190, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g. video frames, audio, etc.) for the gaming application in response to controller input by a player. The distribution synchronization layer is able to efficiently execute (e.g. through load balancing) those functions across the distributed processing entities, such that critical game engine components/functions are distributed and reassembled for more efficient processing.

Figure 2:
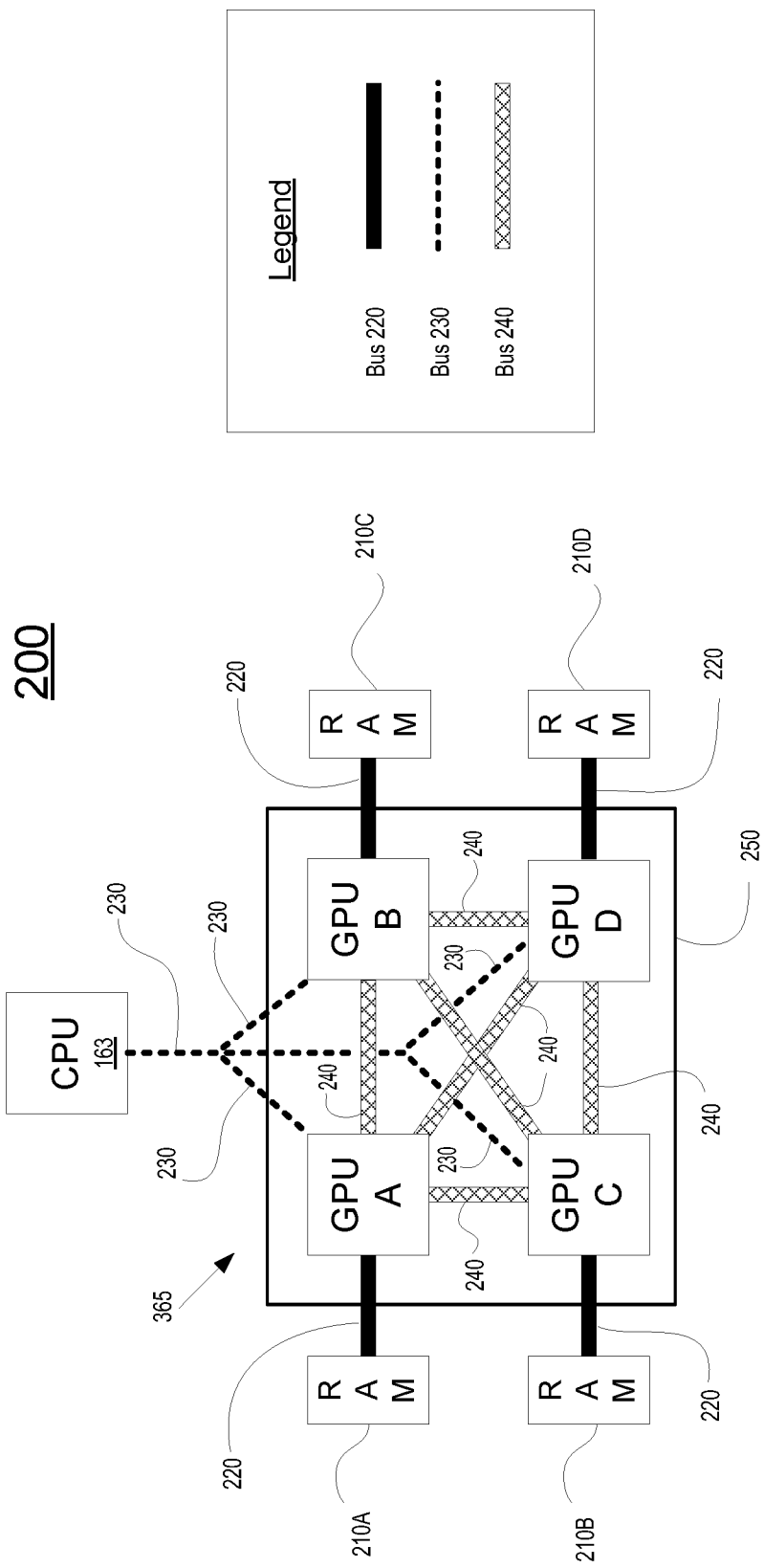
FIG. 2 is a diagram of a multi-GPU architecture wherein multiple GPUs collaborate to render a single image, in accordance with one embodiment of the present disclosure.

FIG. 2 is a diagram of an exemplary multi-GPU architecture 200 wherein multiple GPUs collaborate to render a single image of a corresponding application, in accordance with one embodiment of the present disclosure. It is understood that many architectures are possible in various embodiments of the present disclosure in which multiple GPUs collaborate to render a single image though not explicitly described or shown. For example, multi-GPU rendering of geometry for an application by performing region testing while rendering may be implemented between one or more cloud gaming servers of a cloud gaming system, or may be implemented within a stand-alone system, such as a personal computer or gaming console that includes a high-end graphics card having multiple GPUs, etc.

The multi-GPU architecture 200 includes a CPU 163 and multiple GPUs configured for multi-GPU rendering of a single image for an application, and/or each image in a sequence of images for the application. In particular, CPU 163 and GPU resources 365 are configured for performing processor based functions include 2D or 3D rendering, physics simulation, scripting, audio, animation, graphics processing, lighting, shading, rasterization, ray tracing, shadowing, culling, transformation, artificial intelligence, etc., as previously described.

For example, four GPUs are shown in GPU resources 365 of the multi-GPU architecture 200, though any number of GPUs may be utilized when rendering images for an application. Each GPU is connected via a high speed bus 220 to a corresponding dedicated memory, such as random access memory (RAM). In particular, GPU-A is connected to memory 210A (e.g., RAM) via bus 220, GPU-B is connected to memory 210B (e.g., RAM) via bus 220, GPU-C is connected to memory 210C (e.g., RAM) via bus 220, and GPU-D is connected to memory 210D (e.g., RAM) via bus 220.

Further, each GPU is connected to each other via bus 240 that depending on the architecture may be approximately equal in speed or slower than bus 220 used for communication between a corresponding GPU and its corresponding memory. For example, GPU-A is connected to each of GPU-B, GPU-C, and GPU-D via bus 240. Also, GPU-B is connected to each of GPU-A, GPU-C, and GPU-D via bus 240. In addition, GPU-C is connected to each of GPU-A, GPU-B, and GPU-D via bus 240. Further, GPU-D is connected to each of GPU-A, GPU-B, and GPU-C via bus 240.

CPU 163 connects to each of the GPUs via a lower speed bus 230 (e.g., bus 230 is slower than bus 220 used for communication between a corresponding GPU and its corresponding memory). In particular, CPU 163 is connected to each of GPU-A, GPU-B, GPU-C, and GPU-D.

Figure 4:
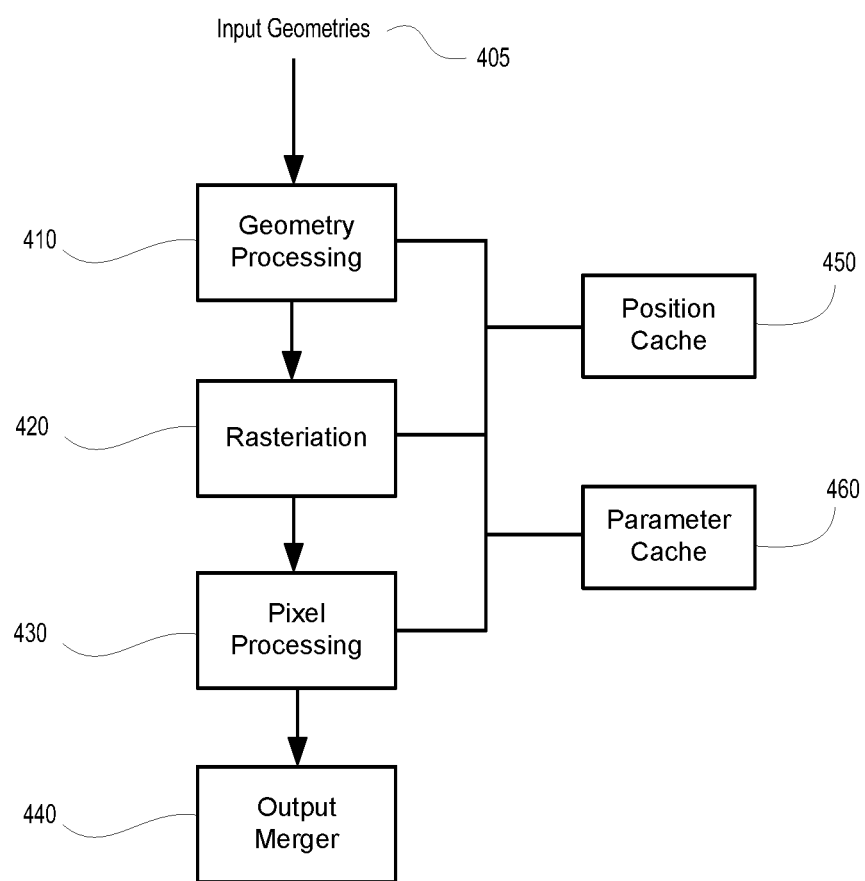
FIG. 4 is a diagram of a rendering architecture implementing a graphics pipeline that is configured for multi-GPU processing, such that multiple GPUs collaborate to render a single image, in accordance with one embodiment of the present disclosure.

In some embodiments, the four GPUs are discrete GPUs, each on their own silicon die. In other embodiments, the four GPUs may share a die in order to take advantage of high speed interconnects and other units on the die. In yet other embodiments, there is one physical GPU 250 that can be configured to be used either as a single more powerful GPU or as four less powerful "virtual" GPUs (GPU-A, GPU-B, GPU-C and GPU-D). That is to say, there is sufficient functionality for GPU-A, GPU-B, GPU-C and GPU-D each to operate a graphics pipeline (as shown in FIG. 4), and the chip as a whole can operate a graphics pipeline (as shown in FIG. 4), and the configuration can be flexibly switched (e.g. between rendering passes) between the two configurations.

Figure 3:
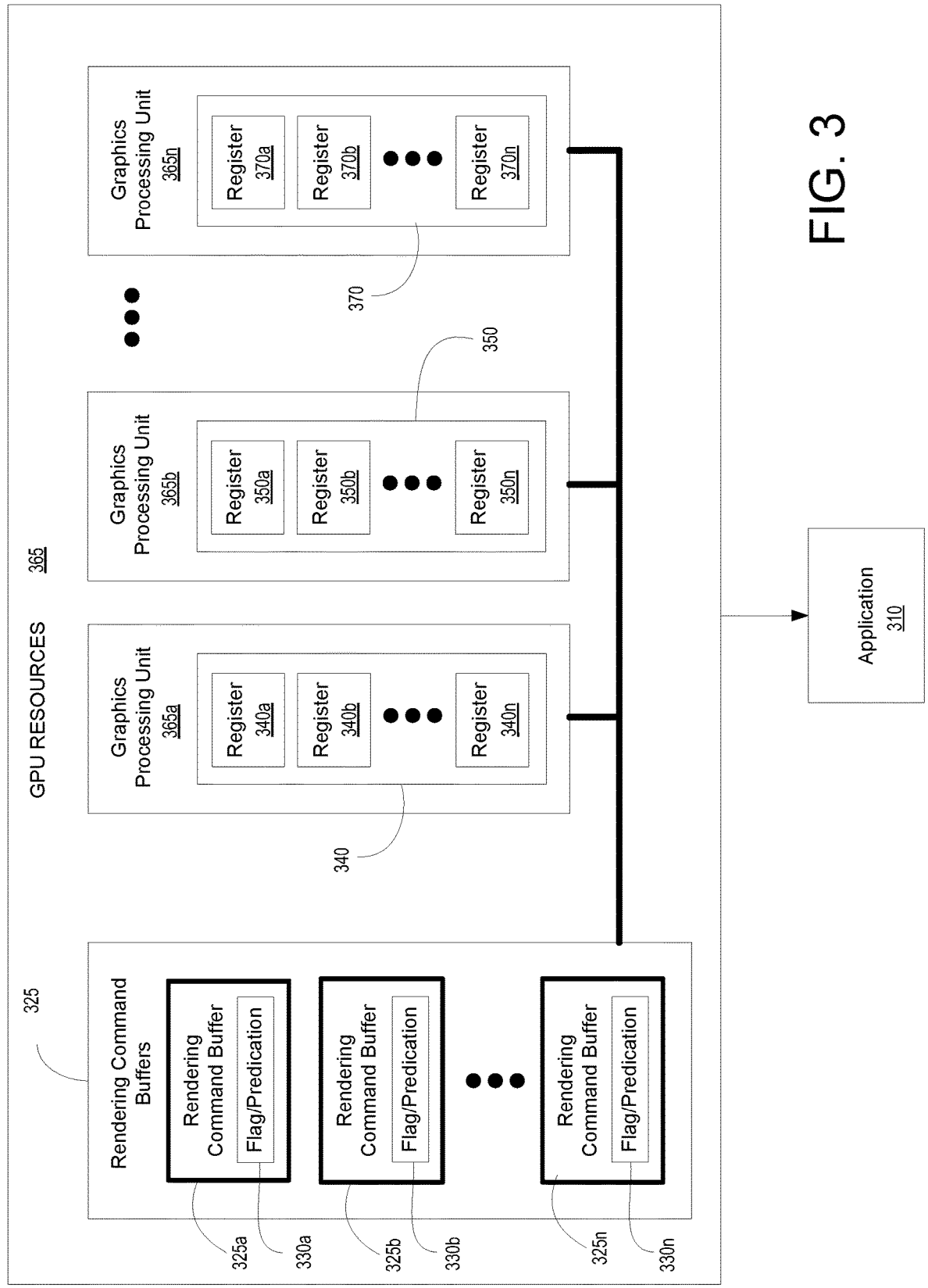
FIG. 3 is a diagram of multiple graphics processing unit resources configured for multi-GPU rendering of geometry for an application by region testing while rendering, in accordance with one embodiment of the present disclosure.

FIG. 3 is a diagram of graphics processing unit resources 365 configured for multi-GPU rendering of geometry when rendering a single image for an application by region testing while rendering, in accordance with one embodiment of the present disclosure. For example, game server 160 may be configured to include GPU resources 365 in the cloud game network 190 of FIG. 1. As shown, GPU resources 365 includes multiple GPUs, such as GPU 365a, GPU 365b . . . GPU 365n. As previously described, various architectures may include multiple GPUs collaborating to render a single image by performing multi-GPU rendering of geometry for an application through region testing while rendering, such as implementing multi-GPU rendering of geometry between one or more cloud gaming servers of a cloud gaming system, or implementing multi-GPU rendering of geometry within a stand-alone system, such as a personal computer or gaming console that includes a high-end graphics card having multiple GPUs, etc.

In particular, in one embodiment, game server 160 is configured to perform multi-GPU processing when rendering a single image of an application, such that multiple GPUs collaborate to render a single image, and/or render each of one or more images of a sequence of images when executing an application. For example, game server 160 may include a CPU and GPU group that is configured to perform multi-GPU rendering of each of one or more images in a sequence of images of the application, wherein one CPU and GPU group could be implementing graphics and/or rendering pipelines for the application, in one embodiment. The CPU and GPU group could be configured as one or more processing devices. As previously described, the GPU and GPU group may include CPU 163 and GPU resources 365, which are configured for performing processor based functions include 2D or 3D rendering, physics simulation, scripting, audio, animation, graphics processing, lighting, shading, rasterization, ray tracing, shadowing, culling, transformation, artificial intelligence, etc.

GPU resources 365 are responsible and/or configured for rendering of objects (e.g. writing color or normal vector values for a pixel of the object to multiple render targets—MRTs) and for execution of synchronous compute kernels (e.g. full screen effects on the resulting MRTs); the synchronous compute to perform, and the objects to render are specified by commands contained in multiple rendering command buffers 325 that the GPU will execute. In particular, GPU resources 365 is configured to render objects and perform synchronous compute (e.g. during the execution of synchronous compute kernels) when executing commands from the rendering command buffers 325, wherein commands and/or operations may be dependent on other operations such that they are performed in sequence.

For example, GPU resources 365 are configured to perform synchronous compute and/or rendering of objects using one or more rendering command buffers 325 (e.g. rendering command buffer 325a, rendering buffer 325b ... rendering command buffer 325n). Each GPU in the GPU resources 365 may have their own command buffers, in one embodiment. Alternatively, when substantially the same set of objects are being rendered by each GPU (e.g., due to small size of the regions), the GPUs in GPU resources 365 may use the same command buffer or the same set of command buffers. Further, each of the GPUs in GPU resources 365 may support the ability for a command to be executed by one GPU, but not by another. For instance, flags on a draw command or predication in the rendering command buffer allows a single GPU to execute one or more commands in the corresponding command buffer, while the other GPUs will ignore the commands. For example, rendering command buffer 325a may support flags 330a, rendering command buffer 325b may support flags 330b ... rendering command buffer 325n may support flags 330n.

Performance of synchronous compute (e.g. execution of synchronous compute kernels) and rendering of objects are part of the overall rendering. For example, if the video game is running at 60 Hz (e.g. 60 frames per second), then all object rendering and execution of synchronous compute kernels for an image frame typically must complete within approximately 16.67 ms (e.g. one frame at 60 Hz). As previously described, operations performed when rendering objects and/or executing synchronous compute kernels are ordered, such that operations may be dependent on other operations (e.g. commands in a rendering command buffer may need to complete execution before other commands in that rendering command buffer can execute).

In particular, each of the rendering command buffers 325 contains commands of various types, including commands that affect a corresponding GPU configuration (e.g. commands that specify the location and format of a render target), as well as commands to render objects and/or execute synchronous compute kernels. For purposes of illustration, synchronous compute performed when executing synchronize compute kernels may include performing full screen effects when the objects have all been rendered to one or more corresponding multiple render targets (MRTs).

In addition, when GPU resources 365 render objects for an image frame, and/or execute synchronous compute kernels when generating the image frame, the GPU resources 365 are configured via the registers of each GPU 365a, 365b ... 365n. For example, GPU 365a is configured via its registers 340 (e.g. register 340a, register 340b ... register 340n) to perform that rendering or compute kernel execution in a certain way. That is, the values stored in registers 340 define the hardware context (e.g. GPU configuration or GPU state) for GPU 365a when executing commands in rendering command buffers 325 used for rendering objects and/or executing synchronous compute kernels for an image frame. Each of the GPUs in GPU resources 365 may be similarly configured, such that GPU 365b is configured via its registers 350 (e.g., register 350a, register 350b ... register 350n) to perform that rendering or compute kernel execution in a certain way; ... and GPU 365n is configured via its registers 370 (e.g., register 370a, register 370b ... register 370n) to perform that rendering or compute kernel execution in a certain way.

Some examples of GPU configuration include the location and format of render targets (e.g. MRTs). Also, other examples of GPU configuration include operating procedures. For instance, when rendering an object, the Z-value of each pixel of the object can be compared to the Z-buffer in various ways. For example, the object pixel is written only if the object Z-value matches the value in the Z-buffer, indicating the object pixel is not occluded. Alternatively, the object pixel could be written only if the object Z-value is the same or less than the value in the Z-buffer, indicating the object pixel is not occluded. The type of test being performed is defined within the GPU configuration.

FIG. 4 is a simplified diagram of a rendering architecture implementing a graphics pipeline 400 that is configured for multi-GPU processing, such that multiple GPUs collaborate to render a single image, in accordance with one embodiment of the present disclosure. The graphics pipeline 400 is illustrative of the general process for rendering images using 3D (three dimensional) polygon rendering processes. The graphics pipeline 400 for a rendered image outputs corresponding color information for each of the pixels in a display, wherein the color information may represent texture and shading (e.g., color, shadowing, etc.). Graphics pipeline 400 may be implementable within the client device 110, game server 160, game title processing engine 111, and/or GPU resources 365 of FIGS. 1 and 3. That is, various architectures may include multiple GPUs collaborating to render a single image by performing multi-GPU rendering of geometry for an application through region testing while rendering, such as implementing multi-GPU rendering of geometry between one or more cloud gaming servers of a cloud gaming system, or implementing multi-GPU rendering of geometry within a stand-alone system, such as a personal computer or gaming console that includes a high-end graphics card having multiple GPUs, etc.

As shown, the graphics pipeline receives input geometries 405. For example, the geometry processing stage 410 receives the input geometries 405. For example, the input geometries 405 may include vertices within a 3D gaming world, and information corresponding to each of the vertices. A given object within the gaming world can be represented using polygons (e.g., triangles) defined by vertices, wherein the surface of a corresponding polygon is then processed through the graphics pipeline 400 to achieve a final effect (e.g., color, texture, etc.). Vertex attributes may include normal (e.g., which direction is perpendicular to the geometry at that location), color (e.g., RGB—red, green, and blue triple, etc.), and texture coordinate/mapping information.

The geometry processing stage 410 is responsible for (and capable of) both vertex processing (e.g. via a vertex shader) and primitive processing. In particular, the geometry processing stage 410 may output sets of vertices that define primitives and deliver them to the next stage of the graphics pipeline 400, as well as positions (to be precise, homogeneous coordinates) and various other parameters for those vertices. The positions are placed in the position cache 450 for access by later shader stages. The other parameters are placed in the parameter cache 460, again for access by later shader stages.

Various operations may be performed by the geometry processing stage 410, such as performing lighting and shadowing calculations for the primitives and/or polygons. In one embodiment, as the geometry stage is capable of processing of primitives, it can perform backface culling, and/or clipping (e.g., testing against the view frustum), thereby reducing the load on downstream stages (e.g., rasterization stage 420, etc.). In another embodiment, the geometry stage may generate primitives (e.g. with functionality equivalent to a traditional geometry shader).

The primitives output by the geometry processing stage 410 are fed into the rasterization stage 420 that converts the primitives into a raster image composed of pixels. In particular, the rasterization stage 420 is configured to project objects in the scene to a two-dimensional (2D) image plane defined by the viewing location in the 3D gaming world (e.g., camera location, user eye location, etc.). At a simplistic level, the rasterization stage 420 looks at each primitive and determines which pixels are affected by the corresponding primitive. In particular, the rasterizer 420 partitions the primitives into pixel sized fragments, wherein each fragment corresponds to a pixel in the display. It is important to note that one or more fragments may contribute to the color of a corresponding pixel when displaying an image.

As previously described, additional operations may also be performed by the rasterization stage 420 such as clipping (identify and disregard fragments that are outside the viewing frustum) and culling (disregard fragments that are occluded by closer objects) to the viewing location. With reference to clipping, the geometry processing stage 410 and/or rasterization stage 420 may be configured to identify and disregard primitives that are outside the viewing frustum as defined by the viewing location in the gaming world.

The pixel processing stage 430 uses the parameters created by the geometry processing stage, as well as other data, to generate values such as the resulting color of the pixel. In particular, the pixel processing stage 430 at its core performs shading operations on the fragments to determine how the color and brightness of a primitive varies with available lighting. For example, pixel processing stage 430 may determine depth, color, normal and texture coordinates (e.g., texture details) for each fragment, and may further determine appropriate levels of light, darkness, and color for the fragments. In particular, pixel processing stage 430 calculates the traits of each fragment, including color and other attributes (e.g., z-depth for distance from the viewing location, and alpha values for transparency). In addition, the pixel processing stage 430 applies lighting effects to the fragments based on the available lighting affecting the corresponding fragments. Further, the pixel processing stage 430 may apply shadowing effects for each fragment.

The output of the pixel processing stage 430 includes processed fragments (e.g., texture and shading information) and is delivered to the output merger stage 440 in the next stage of the graphics pipeline 400. The output merger stage 440 generates a final color for the pixel, using the output of the pixel processing stage 430, as well as other data, such as a value already in memory. For example, the output merger stage 440 may perform optional blending of values between fragments and/or pixels determined from the pixel processing stage 430, and values already written to an MRT for that pixel.

Color values for each pixel in the display may be stored in a frame buffer (not shown). These values are scanned to the corresponding pixels when displaying a corresponding image of the scene. In particular, the display reads color values from the frame buffer for each pixel, row-by-row, from left-to-right or right-to-left, top-to-bottom or bottom-to-top, or any other pattern, and illuminates pixels using those pixel values when displaying the image.

Figure 5:
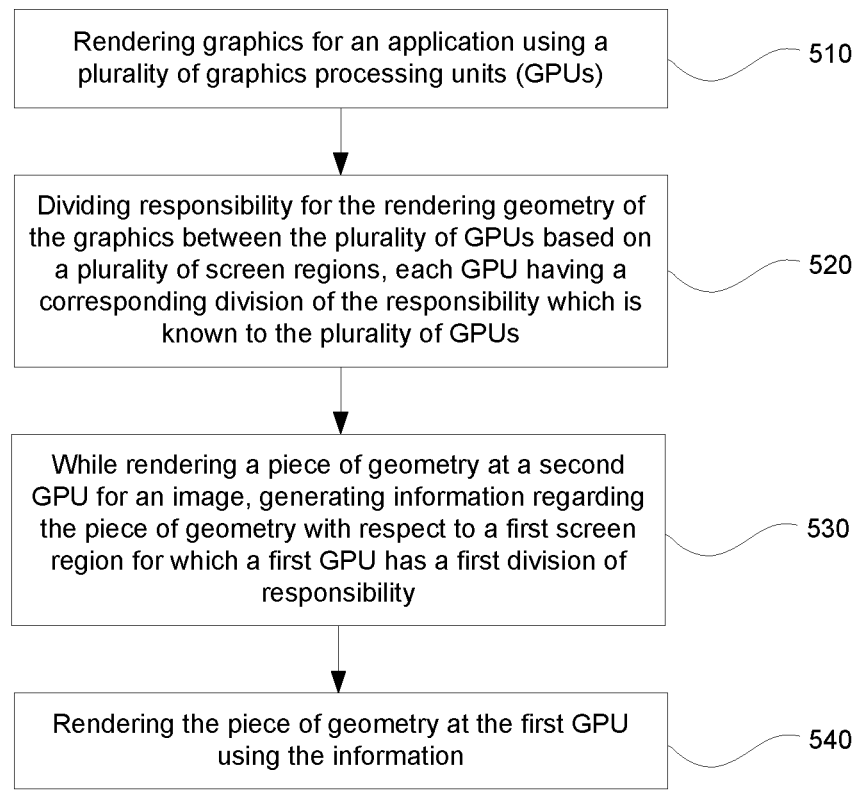
FIG. 5 is a flow diagram illustrating a method for graphics processing including multi-GPU rendering of geometry for an application by region testing while rendering, in accordance with one embodiment of the present disclosure.

With the detailed description of the cloud game network 190 (e.g. in the game server 160) and the GPU resources 365 of FIGS. 1-3, flow diagram 500 of FIG. 5 illustrates a method for graphics processing when implementing multi-GPU rendering of geometry for an application by region testing while rendering, in accordance with one embodiment of the present disclosure. In that manner, multiple GPU resources are used to perform rendering of objects and/or synchronous compute operations when executing an application. As previously described, various architectures may include multiple GPUs collaborating to render a single image by performing multi-GPU rendering of geometry for an application through region testing while rendering, such as within one or more cloud gaming servers of a cloud gaming system, or within a stand-alone system, such as a personal computer or gaming console that includes a high-end graphics card having multiple GPUs, etc.

At 510, the method includes rendering graphics for an application using a plurality of graphics processing units (GPUs) that collaborate to generate an image. In particular, multi-GPU processing is performed when rendering a single image and/or each of one or more images of a sequence of images for a real-time application.

At 520, the method includes dividing responsibility for the rendering geometry of the graphics between the plurality of GPUs based on a plurality of screen regions. That is, each GPU has a corresponding division of the responsibility (e.g., corresponding screen region) which is known to all the GPUs.

The GPUs render a corresponding image simultaneously. While rendering geometry, GPUs generate information regarding the geometry and its relation to the screen regions for which other GPUs are responsible. This allows the other GPUs to more efficiently render the geometry, and/or to avoid rendering that geometry altogether. In other words, a GPU that is "ahead" of the others in rendering can give information to the other GPUs that will accelerate their processing. In particular, at 530, the method includes generating information regarding the piece of geometry with respect to a first screen region for which a first GPU has a first division of responsibility, while rendering a piece of geometry at a second GPU for an image. More specifically, each of the GPUs is responsible for rendering geometry in a corresponding set of screen regions of the plurality of screen regions, wherein the corresponding set of screen regions includes one or more screen regions. For example, the first GPU has the first division of responsibility for rendering objects in a first set of screen regions (e.g. including the first screen region). Also, the second GPU has a second division of responsibility for rendering objects in a second set of screen regions. As such, each GPU begins rendering the objects simultaneously, wherein one GPU that is ahead in rendering the objects may generate a hint about a piece of geometry that is helpful to another GPU that may or may not be responsible for rendering that piece of geometry.

For example, while rendering pieces of geometry, the GPUs test the geometry in relation to the screen regions that the other GPUs are responsible for. The test results (e.g., information) are sent to those other GPUs. In particular, while rendering, a second GPU tests the geometry of an image. The second GPU generates information for a first GPU about the geometry in relation to screen region or regions that the first GPU is assigned responsibility. The test may include, for example, whether or not a piece of geometry overlaps the screen region or regions that the first GPU is assigned responsibility.

At 540, the method includes rendering the piece of geometry at the first GPU using the information. Specifically, in some architectures, if a corresponding rendering GPU receives corresponding information in time to use it, that GPU will use the information when deciding which geometry to render within a corresponding image. That is, the information may be taken as a hint. Otherwise, the rendering GPU will process the piece of geometry as it ordinarily would. Using the example wherein the information may indicate whether the geometry overlaps a screen region or regions assigned to the first GPU (e.g. the rendering GPU), if the information indicates there is no overlapping of the geometry, the first GPU may skip rendering the geometry entirely. Also, if the information indicates that only pieces of the geometry do not overlap, the first GPU may skip those pieces of geometry that do not overlap the screen region or regions that the first GPU is assigned responsibility. On the other hand, the information may indicate that there is overlapping for the geometry, in which case the first GPU would render the geometry. Also, the information may indicate that certain pieces of the geometry overlap the screen region or regions that the first GPU is assigned responsibility. In that case, the first GPU would render only those pieces of the geometry that overlap. In still another embodiment, if there is no information, or if the information is not generated or received in time, the first GPU would perform rendering normally (e.g., render the geometry). As such, information provided as a hint may increase overall efficiency of the graphics processing system if received in time. If the information is not received in time, the graphics processing system will still operate properly in the absence of such information, in one embodiment.

Figure 6A:
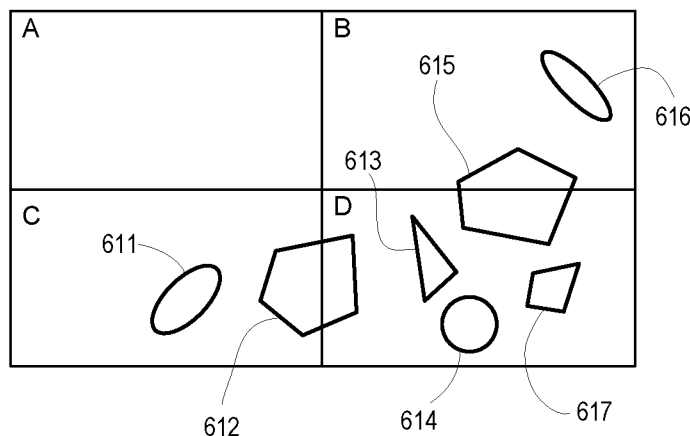
FIG. 6A is a diagram of a screen that is subdivided into quadrants when performing multi-GPU rendering, in accordance with one embodiment of the present disclosure.
Figure 6B:
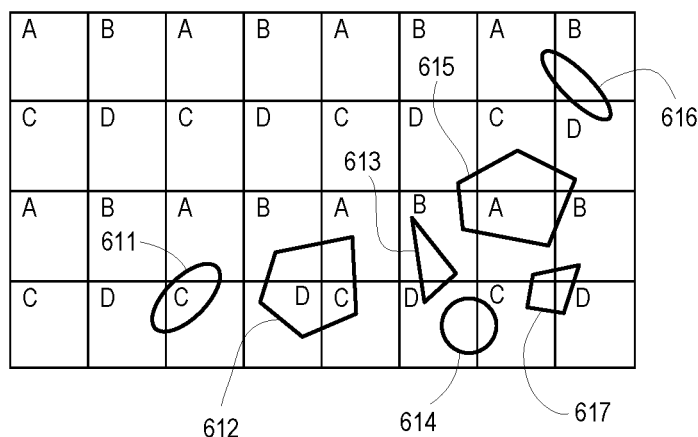
FIG. 6B is a diagram of a screen that is subdivided into a plurality of interleaved regions when performing multi-GPU rendering, in accordance with one embodiment of the present disclosure.

FIGS. 6A-6B show renderings to screens that are subdivided into regions, purely for purposes of illustration. It is understood that the number of subdivided regions is selectable for efficient multi-GPU processing of an image and/or each of one or more images of a sequence of images. That is, the number of subdivided regions may include two or more regions. In one embodiment of the present disclosure, the screen is subdivided into four quadrants as shown in FIG. 6A. In another embodiment of the present disclosure, the screen is subdivided into a larger number of interleaved regions as shown in FIG. 6B. The discussion of FIGS. 6A-6B below is intended to illustrate the inefficiencies that arise when performing multi-GPU rendering to a plurality of screen regions to which a plurality of GPUs are assigned;

FIGS. 7A-7C and FIGS. 8A-8B show more efficient rendering, according to some embodiments of the invention.

In particular, FIG. 6A is a diagram of a screen 610A that is subdivided into quadrants (e.g. four regions) when performing multi-GPU rendering. As shown, screen 610A is subdivided into four quadrants (e.g. A, B, C, and D). Each quadrant is assigned to one of the four GPUs [GPU-A, GPU-B, GPU-C, and GPU-D], in a one-to-one relationship. For example, GPU-A is assigned to quadrant A, GPU-B is assigned to quadrant B, GPU-C is assigned to quadrant C, and GPU-D is assigned to quadrant D.

The geometry can be culled. For example, CPU 163 can check a bounding box against each quadrant's frustum, and request each GPU to render only the objects that overlap its corresponding frustum. The result is that each GPU is responsible for rendering only a portion of the geometry. For purposes of illustration, screen 610 shows pieces of geometry, wherein each piece is a corresponding object, wherein screen 610 shows objects 611-617 (e.g. pieces of geometry). GPU-A will render no objects, as no objects overlap Quadrant A. GPU-B will render objects 615 and 616 (as a portion of object 615 is present in Quadrant B, the CPU's culling test will correctly conclude that GPU-B must render it). GPU-C will render objects 611 and 612. GPU-D will render objects 612, 613, 614, 615 and 617.

In FIG. 6A, when the screen 610A is divided into quadrants A-D, the amount of work that each GPU must perform may be very different, as a disproportionate amount of geometry may be in one quadrant in some situations. For example, quadrant A does not have any pieces of geometry, whereas quadrant D has five pieces of geometry, or at least portions of at least five pieces of geometry. As such, GPU-A assigned to quadrant A would be idle, while GPU-D assigned to quadrant D would be disproportionately busy when rendering objects in the corresponding image.

FIG. 6B illustrates another technique when subdividing a screen into regions. In particular, rather than subdividing into quadrants, screen 610B is subdivided into a plurality of interleaved regions when performing multi-GPU rendering of a single image or each of one or more images in a sequence of images. In that case, screen 610B is subdivided into a larger number of interleaved regions (e.g. greater than the four quadrants), while using the same amount of GPUs for rendering (e.g. four). The objects (611-617) shown in screen 610A are also shown in screen 610B in the same corresponding locations.

In particular, four GPUs [GPU-A, GPU-B, GPU-C, and GPU-D] are used to render an image for a corresponding application. Each of the GPUs is responsible for rendering geometry overlapping a corresponding region. That is, each GPU is assigned to a corresponding set of regions. For example, GPU-A is responsible for each of the regions labeled A in a corresponding set, GPU-B is responsible for each of regions labeled B in a corresponding set, GPU-C is responsible for each of regions labeled C in a corresponding set, and GPU-D is responsible for each of regions labeled D in a corresponding set.

Further, the regions are interleaved in a particular pattern. Because of the interleaving (and higher number) of regions, the amount of work that each GPU must perform may be much more balanced. For example, the pattern of interleaving of screen 610B includes alternating rows including regions A-B-A-B and so on, and regions C-D-C-D and so on. Other patterns of interleaving the regions is supported in embodiments of the present disclosure. For example, patterns may include repeated sequences of regions, evenly distributed regions, uneven distribution of regions, repeated rows of sequences of regions, random sequences of regions, random rows of sequences of regions, etc.

Choosing the number of regions is important. For example, if the distribution of regions is too fine (e.g., the number of regions is too great to be optimal), each GPU must still process most or all of the geometry. For example, it may be difficult to check object bounding boxes against all of the regions that a GPU is responsible for. Also, even if bounding boxes can be checked in a timely manner, due to small region size, the result will be that each GPU likely has to process most of the geometry because every object in an image overlaps at least one region of each of the GPUs (e.g. a GPU processes an entire object even though only a portion of the object overlaps at least one region in a set of regions assigned to that GPU).

As a result, choosing the number of regions, the pattern of interleaving, etc. is important. Choosing too few or too many regions, or too few regions or too many regions for interleaving, or choosing an inefficient pattern for interleaving may lead to inefficiencies when performing GPU processing (e.g. each GPU processing most or all of the geometry). In those cases, even though there are multiple GPUs for rendering an image, due to GPU inefficiencies, there is not the ability to support a corresponding increase in both screen pixel count and density of geometry (i.e. four GPUs can't write four times the pixels and process four times the vertices or primitives). The following embodiments target improvements in culling strategy (FIGS. 7A-7C) and granularity of culling (FIGS. 8A-8B), among other advances.

Figure 7A:
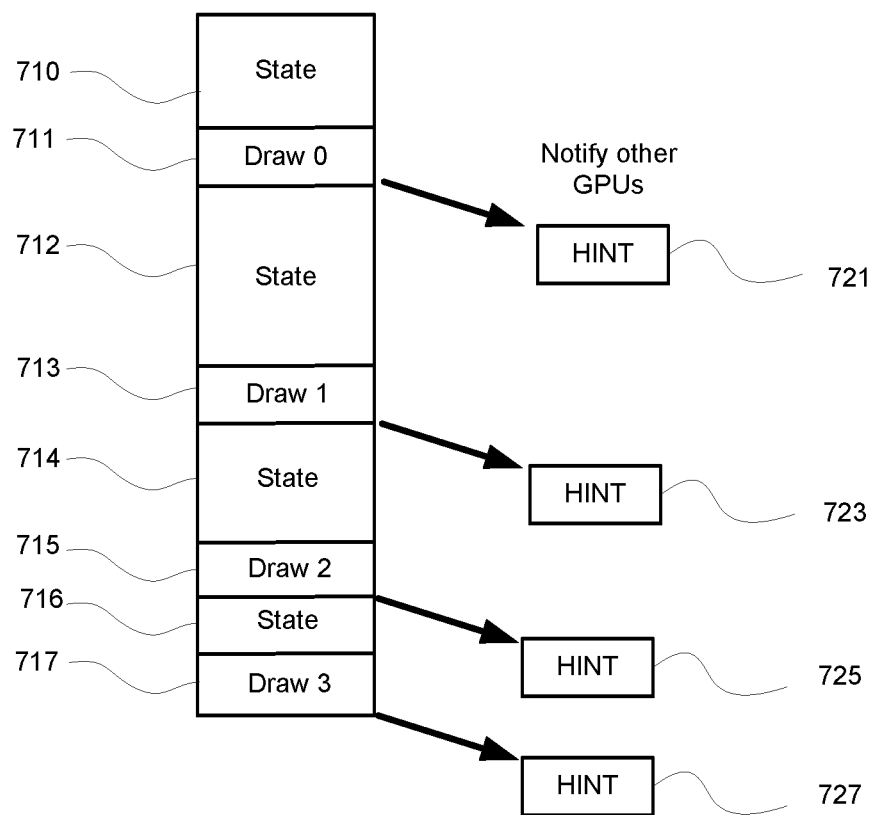
FIG. 7A is a diagram of a rendering command buffer that is shared by multiple GPUs that collaborate to render a single image, in accordance with one embodiment of the present disclosure.
Figures 1, 2, 7B:
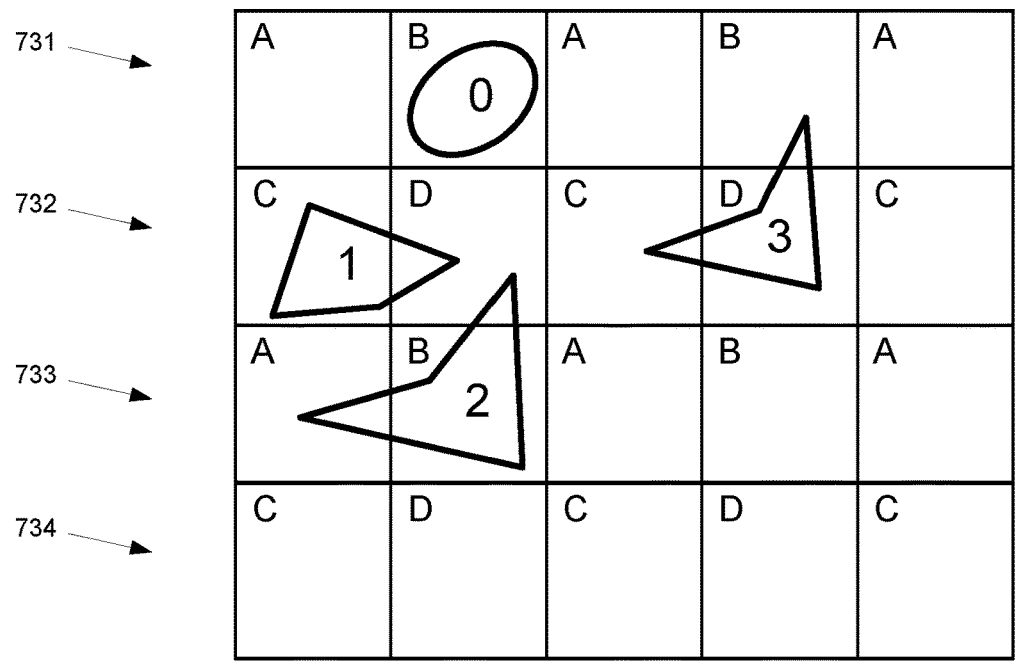
Figure 7C:
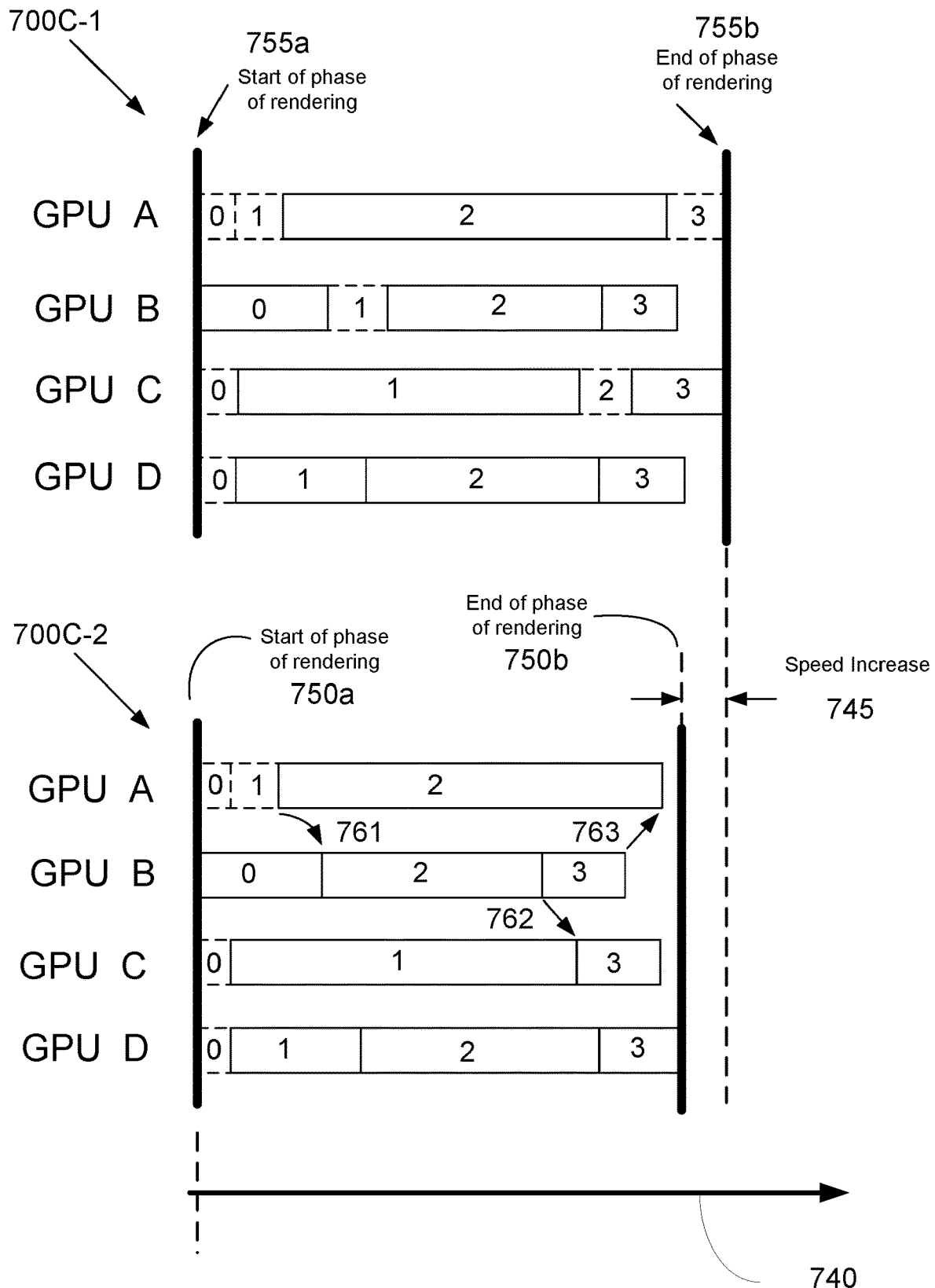
FIG. 7C is a diagram illustrating the rendering of each object as performed by each GPU when rendering an image frame through collaboration of multiple GPUs (e.g., the image of FIG. 7B-1), in accordance with one embodiment of the present disclosure.

FIGS. 7A-7C are diagrams illustrating the use of multiple GPUs to render a single image, and/or each of at least one or more images in a sequence of images, in embodiments of the present disclosure. The selection of four GPUs is made purely for ease of illustrating multi-GPU rendering when rendering an image while executing an application, and it is understood that any number of GPUs may be used for multi-GPU rendering in various embodiments.

In particular, FIG. 7A is a diagram of a rendering command buffer 700A that is shared by multiple GPUs that collaborate to render a single image, in accordance with one embodiment of the present disclosure. That is, in the present example the multiple GPUs each use the same rendering command buffer (e.g., buffer 700A), and each of the GPUs execute all commands in the rendering command buffer. A plurality of commands (complete set) is loaded into rendering command buffer 700A, and is used for rendering a corresponding image. It is understood that one or more rendering command buffers may be used to generate a corresponding image. In one example, the CPU generates one or more draw calls for an image frame, wherein the draw calls include commands placed into one or more rendering command buffers for execution by one or more GPUs of the GPU resources 365 of FIG. 3 when performing multi-GPU rendering of a corresponding image. In some implementations, the CPU 163 may request one or more GPUs to generate all or some of the draw calls used for rendering a corresponding image. Further, the entire set of commands may be shown in FIG. 7A and are all contained within the rendering command buffer 700A, or FIG. 7A may show a portion of the entire set of commands contained within the rendering command buffer 700A.

GPUs render simultaneously when performing multi-GPU rendering of an image or each of one or more images in a sequence of images. Rendering of an image can be broken down into multiple phases. In each of the phases, the GPUs need to be synchronized, such that a faster GPU must wait until the slower GPUs complete. The commands shown in FIG. 7A for the rendering command buffer 700A shows one phase, wherein the rendering command buffer 700A may include commands for one or more phases when rendering an image. In the piece of the rendering command buffer 700A shown in FIG. 7A that illustrates one phase, there are four objects to be rendered (e.g., object 0, object 1, object 2, and object 3), as is shown in FIG. 7B-1.

As shown, the piece of the rendering command buffer 700A shown in FIG. 7A includes commands for rendering objects and commands for configuring a state of the one or more rendering GPUs that are executing commands from rendering command buffer 700A. The commands may be further separated into sections of commands, wherein each section includes one or more commands. Commands for object rendering and/or synchronous compute are performed as part of the rendering of a corresponding image (e.g., image frame). In some implementations, the rendering of objects for that image and/or the execution of synchronous compute kernels must be performed within a frame period. For purposes of illustration only, the piece of rendering command buffer 700A shown in FIG. 7A includes eight sections of commands (710-717) used for rendering objects and/or executing synchronous compute kernels when rendering a corresponding image for a corresponding application.

For example, the piece of the rendering command buffer 700A shown in FIG. 7A includes four sections of commands 710, 712, 714, and 716, each used for configuring a state of the one or more rendering GPUs that are executing commands in rendering command buffer 700A. As previously described, values stored in the registers define the hardware context (e.g. GPU configuration) for the corresponding GPU when executing commands in the rendering command buffer 700A used for rendering objects and/or executing synchronous compute kernels for a corresponding image. As shown, the GPU state may be modified throughout the processing of commands in the rendering command buffer 700A, each subsequent section of commands may be used for configuring the GPU state.

Also, the piece of the rendering command buffer 700A shown in FIG. 7A includes sections of commands 711, 713, 715, and 717 that are used for rendering a corresponding object. For example, one or more commands in section 711 are used for drawing and/or rendering object 0, one or more commands in section 713 are used for drawing and/or rendering object 1, one or more commands in section 715 are used for drawing and/or rendering object 2, and one or more commands in section 717 are used for drawing and/or rendering object 3. Though FIG. 7A shows that sections used for configuration GPU state precede each of the sections of commands used for object rendering, it is understood that a GPU state may be configured to render one or more objects.

The multiple GPUs share information (e.g. "hints") to help determine which objects need to be rendered by a corresponding GPU. Each GPU may be responsible for rendering within a particular region of a screen (e.g. set of regions assigned to a corresponding GPU for object rendering), wherein the corresponding GPU renders objects that completely and/or partially overlap that region or set of regions. During rendering, a second GPU may generate a hint regarding objects and their locations within a screen. As shown hint 721 may be generated by the second GPU while performing rendering operations with regards to object 0, and may be provided to each of the other GPUs. Similarly, hint 723 may be generated by the second GPU while performing rendering operations with regards to object 1, and may be provided to each of the other GPUs. Further, hint 725 may be generated by the second GPU while performing rendering operations with regards to object 2. Also, hint 727 may be generated by the second GPU while performing rendering operations with regards to object 3.

In particular, during rendering the second GPU may test at least one of the objects in an image (e.g. geometry) in relation to screen regions for which other GPUs have rendering responsibility. Information including test results may be sent to those other GPUs, such that those other GPUs may use that information if received in a timely fashion for purposes of reducing their own testing of objects, and/or efficiently rendering those objects. For example, the information may indicate that a first GPU should skip rendering a piece of geometry entirely (e.g., the piece of geometry does not overlap a screen region that the first GPU is assigned responsibility for object rendering). In another example, the information is provided as a hint to the first GPU, such that the information is considered by the first GPU if received before rendering begins for that first piece of geometry at the first GPU. In one embodiment, the first piece of geometry is fully rendered by the first GPU if the information is not received in time.

For purposes of illustration only, four GPUs are dividing up a corresponding screen into regions between them. The arrows are showing the notification of the other GPUs of region testing. For example, a second GPU that generates a hint during rendering, provides that hint (e.g., information) to other GPUs (e.g. first GPU). As previously described, each GPU is responsible for rendering objects in a corresponding set of regions, wherein the corresponding set includes one or more regions.

In one embodiment, rendering command buffer 700A is shared by multiple GPUs that collaborate to render a single image. That is, the GPUs used for multi-GPU rendering of a single image or each of one or more images in a sequence of images share a common command buffer. In that manner, the second GPU that provides a hint for an object to another GPU (e.g. the first GPU) that may or may not render the same object each share the same command buffer. In another embodiment, each GPU might have its own command buffer.

Alternatively, in still another embodiment each of the GPUs might be rendering somewhat different sets of objects. This may be the case when it can be determined that a specific GPU does not need to render a specific object because it does not overlap its corresponding screen regions in a corresponding set. The multiple GPUs can still use the same command buffer (e.g., sharing one command buffer), as long as the command buffer supports the ability for a command to be executed by one GPU but not by another, as previously described. For example, execution of a command in the shared rendering command buffer 700A may be limited to one of the rendering GPUs. This could be accomplished in a variety of ways. In another example, flags may be used on a corresponding command to indicate which GPUs should execute it. Also, predication may be implemented in the rendering command buffer using bits to say which GPU does what under which condition. An example of predication includes—"If this is GPU-A, then skip the following X commands".

In still another embodiment, as substantially the same set of objects is being rendered by each GPU, the multiple GPUs may still use the same command buffer. For example, when the regions are relatively small, each GPU may still render all of the objects, as previously described.

FIG. 7B-1 illustrates a screen 700B showing an image including four objects that are rendered by multiple GPUs using the rendering command buffer 700A of FIG. 7A, in accordance with one embodiment of the present disclosure. Multi-GPU rendering of geometry is performed for an application by region testing during the rendering of the geometry in a corresponding image.

In particular, responsibility for rendering of geometry is divided up by screen region between the multiple GPUs, wherein the plurality of screen regions is configured to reduce imbalance of rendering time between the plurality of GPUs. For example, screen 700B shows the screen region responsibilities for each GPU when rendering the objects of the image. Four GPUs (GPU-A, GPU-B, GPU-C, and GPU-D) are used for rendering objects in the image shown in screen 700B. Screen 700B is divided more finely than by quadrants as shown in FIG. 6A, in an effort to balance pixel and vertex load between the GPUs. In addition, screen 700B is divided into regions that are interleaved. For example, the interleaving includes multiple rows of regions. Each of rows 731 and 733 includes region A alternating with region B. Each of rows 732 and 734 includes region C alternating with region D. More particularly, rows including regions A and B alternate with rows including regions C and D, in a pattern.

As previously described, to achieve GPU processing efficiency various techniques may be used when dividing the screen into regions, such as increasing or decreasing the number of regions (e.g., to choose the correct amount of regions), interleaving regions, increasing or decreasing the number of regions for interleaving, selecting a particular pattern when interleaving regions, etc. In one embodiment, each of the plurality of screen regions is uniformly sized. In one embodiment, each of the plurality of screen regions is not uniform in size. In still another embodiment, the number and sizing of a plurality of screen regions changes dynamically.

Each of the GPUs is responsible for rendering of objects in a corresponding set of regions, wherein each set may include one or more regions. As such, GPU-A is responsible for rendering of objects in each of the A regions in a corresponding set, GPU-B is responsible for rendering of objects in each of the B regions in a corresponding set, GPU-C is responsible for rendering of objects in each of the C regions in a corresponding set, and GPU-D is responsible for rendering of objects in each of the D regions in a corresponding set. There might also be GPUs that have other responsibilities, such that they may not perform rendering (e.g., perform asynchronous compute kernels that execute over multiple frame periods, perform culling for the rendering GPUs, etc.).

The amount of rendering to be performed is different for each GPU. FIG. 7B-2 illustrates a table showing the rendering performed by each GPU when rendering the four objects of FIG. 7B-1, in accordance with one embodiment of the present disclosure. As shown in the table, GPU A renders object 2; GPU B renders objects 0, 2 and 3; GPU C renders objects 1 and 3; and GPU D renders objects 1, 2, and 3. There may still be some unbalanced rendering, as GPU A needs to render object 2 only, and GPU D needs to render objects 1, 2 and 3. However, overall, with interleaving of screen regions, the rendering of objects within an image is reasonably balanced across the multiple GPUs used for multi-GPU rendering of an image, or rendering of each of one or more images in a sequence of images.

FIG. 7C is a diagram illustrating the rendering of each object as performed by each GPU when multiple GPUs collaborate to render the single image shown in FIG. 7B-1, in accordance with one embodiment of the present disclosure. In particular, FIG. 7C shows the rendering process of objects 0-3 as performed by each of the four GPUs (e.g., GPU-A, GPU-B, GPU-C, and GPU-D) using the shared rendering command buffer 700A of FIG. 7A.

In particular, two rendering timing diagrams are shown with respect to a timeline 740. Rendering timing diagram 700C-1 shows multi-GPU rendering of objects 0-3 of a corresponding image in one phase of rendering, wherein each of the GPUs perform rendering in the absence of any hints regarding the overlap between objects 0-3 and the screen regions. Rendering timing diagram 700C-2 shows multi-GPU rendering of objects 0-3 of the corresponding image in the same phase of rendering, wherein hints are shared during rendering to each of the GPUs regarding the overlap between objects 0-3 and the screen regions. Each of rendering timing diagrams 700C-1 and 700C-2 show the time taken by each GPU to process each piece of geometry. In one embodiment, a piece of geometry is an entire object. In another embodiment, a piece of geometry may be a portion of an object. For purposes of illustration, the example of FIG. 7C shows the rendering of pieces of geometry, wherein each piece of geometry corresponds to an object (e.g. in its entirety). In each of the rendering timing diagrams 700C-1 and 700C-2 objects (e.g. pieces of geometry) that have no geometry (e.g. a primitive of the object) that overlaps at least one screen region (e.g. in a corresponding set of regions) of a corresponding GPU are represented by boxes drawn with dashed lines. On the other hand, objects that have geometry that overlaps at least one screen region (e.g. in a corresponding set of regions) of a corresponding GPU are represented by boxes drawn with solid lines.

Rendering timing diagram 700C-1 shows rendering of objects 0-3 using the four GPUs (e.g. GPU-A, GPU-B, GPU-C, and GPU-D). Vertical line 755a indicates the start of the phase of rendering for the objects, and vertical line 755b shows the end of the phase of rendering for the objects in rendering timing diagram 700C-1. The start and end points along timeline 740 for the phase of rendering shown represent synchronization points, wherein each of the four GPUs are synchronized when executing a corresponding GPU pipeline. For instance, at vertical line 755b indicating the end of the phase of rendering, all GPUs must wait for the slowest GPU (e.g. GPU-B) to finish rendering objects 0-3 through the corresponding graphics pipeline before moving to the next phase of rendering.

Hinting is not provided while rendering objects shown in rendering timing diagram 700C-1. As such, each of the GPUs must process each of the objects through the corresponding graphics pipeline. A GPU may not fully render an object through the graphics pipeline if there are no pixels to be drawn for the object in the regions assigned (e.g. in a corresponding set of regions) to the corresponding GPU for object rendering. For example, when an object does not overlap, only the geometry processing stage of the graphics pipeline is executed. However, without hinting this still takes some time for processing.

In particular, GPU-A does not fully render objects 0, 1, and 3, because they do not overlap any of the screen regions assigned to GPU-A for object rendering. The rendering of these three objects is shown in boxes with dashed lines indicating that at least the geometry processing stage is performed, but the graphics pipeline is not fully performed. GPU-A fully renders object 2 because that object overlaps at least one screen region (e.g. in a corresponding set) assigned to GPU-A for rendering. The rendering of object 2 is shown in a box with solid lines indicating that all of the stages of the corresponding graphics pipeline are performed. Similarly, GPU-B does not fully render object 1 (shown with a box with dashed lines) (i.e. performing at least geometry processing stage), but fully renders objects 0, 2, and 3 (shown with boxes with solid lines) because those objects overlap at least one screen region (e.g. in a corresponding set) assigned to GPU-B for rendering. Also, GPU-C does not fully render objects 0 and 2 (shown with boxes with dashed lines) (i.e. performing at least geometry processing stage), but fully renders objects (shown with boxes with solid lines) because those objects overlap at least one screen region (e.g. in a corresponding set) assigned to GPU-C for rendering. Further, GPU-D does not fully render object 0 (shown with a box with dashed lines) (i.e. performing at least geometry processing stage), but fully renders objects 1, 2, and 3 (shown with boxes with solid lines) because those objects overlap at least one screen region (e.g. in a corresponding set) assigned to GPU-D for rendering.

Rendering timing diagram 700C-2 shows rendering of objects 0-3 when performing multi-GPU rendering with sharing of hints. Specifically, hints are shared between each of the GPUs (e.g. GPU-A, GPU-B, GPU-C, and GPU-D) and considered when rendering the objects 0-3 through a corresponding GPU pipeline. Vertical line 750a indicates the start of the phase of rendering for the objects, and vertical line 750b shows the end of the phase of rendering for the objects in rendering timing diagram 700C-2. The start and end points along timeline 740 for the phase of rendering shown in timing diagram 700C-2 represent synchronization points, wherein each of the four GPUs are synchronized when executing a corresponding GPU pipeline, as previously described. For instance, at vertical line 750b indicating the end of the phase of rendering, all GPUs must wait for the slowest GPU (e.g. GPU-B) to finish rendering objects 0-3 through the corresponding graphics pipeline before moving to the next phase of rendering.

Vertical line 750a is aligned with vertical line 755a, such that each of the rendering timing diagrams 700C-1 and 700C-2 begin at the same time to render objects 0-1. However, the rendering of objects 0-3 shown in rendering timing diagram 700C-2 is performed in less time than the rendering shown in rendering timing diagram 700C-1. That is, vertical line 750b indicating the end of phase of rendering for the lower timing diagram 700C-2 occurs earlier than the end of phase of rendering for the upper timing diagram 700C-1 as indicated by vertical line 755b. Specifically, a speed increase 745 when rendering objects 0-3 is realized when performing multi-GPU rendering of geometry of an image for an application when performing region testing and providing the results of those tests with hints. As shown, speed increase 745 is the time difference between vertical line 750b of timing diagram 700C-2 and vertical line 755b of timing diagram 700C-1.

The speed increase is realized through the generation and sharing of hints. In particular, as GPUs process objects through the graphics pipeline, each GPU checks the objects and sends information as hints to other GPUs about how the objects relate those GPUs' screen responsibilities. For example, three hints 761-763 are provided in rendering timing diagram 700C-2, which reduces the overall time used for rendering objects 0-3. The hints may be represented as arrows, wherein a corresponding arrow shows one GPU informing a second GPU that it may skip an object, and the second GPU successfully skipping that object. A hint may be generated at any point during rendering (e.g. during geometry processing stage), such that even if a GPU does not fully render an object (i.e. go through all stages of the graphics pipeline), that GPU may still generate and provide a hint about that object to other GPUs for rendering.

For example, GPU-A performs geometry processing for object 1, and determines that object 1 can be skipped by GPU-B, as object 1 does not overlap any regions (e.g. in a corresponding set) assigned to GPU-B for object rendering. In addition, object 1 is not fully rendered by GPU-A, as it does not overlap any regions (e.g. in a corresponding set) assigned to GPU-A for object rendering. Since the determination that there is no overlap of object 1 by regions assigned to GPU-B is made before GPU-B begins geometry processing for object 1, GPU-B skips the rendering of object 1. In particular, GPU-A begins rendering object 1 (e.g. in the geometry processing stage) and learns that object 1 does not overlap any regions assigned to GPU-B for object rendering. As such, GPU-A may generate and deliver hint 761 with information indicating that GPU-B need not render object 1. The hint 761 is delivered in a timely manner, i.e. before rendering of object 1 begins by GPU-B. As a reference, hint 761 is provided even before the rendering of object 1 is performed by GPU-B in the upper timing diagram 700C-1

(i.e. GPU-B is currently rendering object 0). In that case, GPU-B may fully skip the rendering process for object 1, such that none of the stages of the corresponding graphics pipeline are performed for that object (e.g. the geometry processing stage is not performed).

Continuing with the example of rendering timing diagram 700C-2, GPU-B fully renders object 2. During the rendering of object 2, GPU-B determines that object 2 (e.g. during the geometry processing stage) does not overlap any regions (e.g. in a corresponding set) assigned to GPU-C for object rendering. Since this determination is made before GPU-C begins geometry processing for object 2, GPU-C is able to skip rendering of object 2. For example, GPU-B may generate and deliver hint 762 with information indicating that GPU-C need not render object 2. The hint 762 is delivered in a timely manner, i.e. before rendering of object 2 begins by GPU-C (e.g. GPU-C is currently rendering object 1). As a reference, hint 762 is provided even before the rendering of object 2 is performed by GPU-C in the upper timing diagram 700C-1. In that case, GPU-C may fully skip the rendering process for object 2, such that none of the stages of the corresponding graphics pipeline are performed for that object (e.g. the geometry processing stage as the first stage is not performed).

GPU-B also fully renders object 3. During rendering, GPU-B determines that object 3 (e.g., during geometry processing stage) does not overlap any regions (e.g. in a corresponding set) assigned to GPU-A for object rendering. Since this determination is made before GPU-A begins geometry processing for object 3, GPU-A is able to skip rendering of object 3. For example, GPU-B may generate and deliver hint 763 with information indicating that GPU-A need not render object 3. The hint 763 is delivered in a timely manner, i.e. before rendering of object 3 begins by GPU-A (e.g. GPU-A is currently rendering object 2). In that case, GPU-A may fully skip the rendering process for object 3, such that none of the stages of the corresponding graphics pipeline are performed for that object (e.g. the geometry processing stage as the first stage is not performed).

Figure 8A:
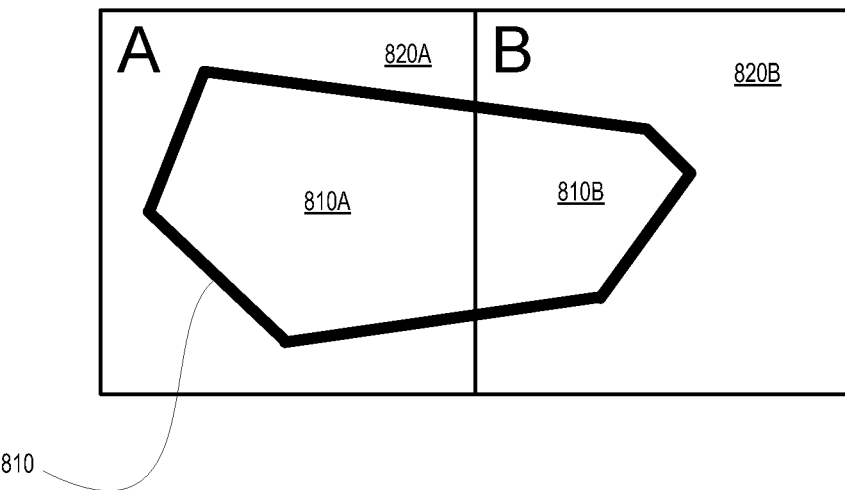
FIG. 8A illustrates object testing against screen regions when multiple GPUs collaborate to render a single image, in accordance with one embodiment of the present disclosure.
Figure 8B:
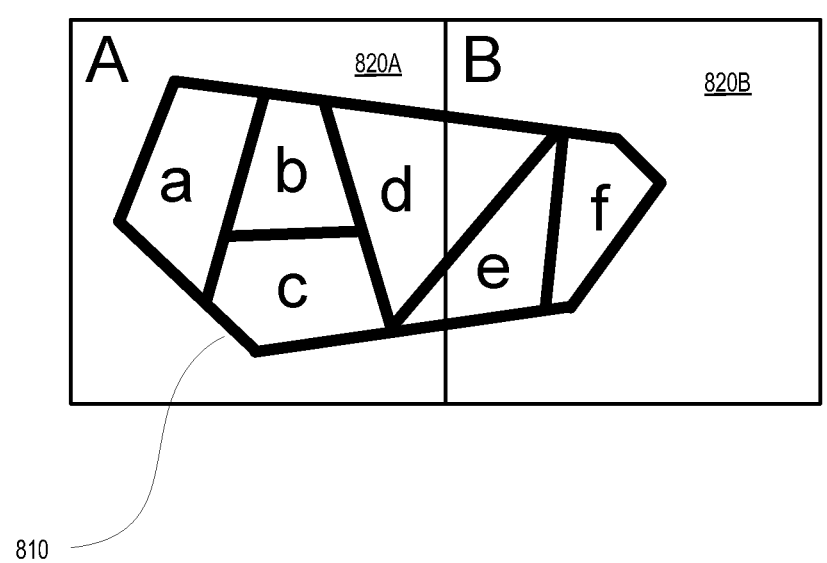
FIG. 8B illustrates testing of portions of an object against screen regions when multiple GPUs collaborate to render a single image, in accordance with one embodiment of the present disclosure.

FIGS. 8A-8B show object testing against screen regions 820A and 820B, wherein the screen regions may be interleaved regions (e.g. screen regions 820A and 820B show a portion of a display). In particular, multi-GPU rendering of objects is performed for a single image, or each of one or more images in a sequence of images by region testing while rendering objects in the screen. GPU-A is assigned responsibility for rendering objects in screen region 820A. GPU-B is assigned responsibility for rendering objects in screen region 820B. Information is generated for "pieces of geometry," wherein the pieces of geometry can be an entire object or portions of objects. For example, a piece of geometry can be an object 810, or portions of object 810.

FIG. 8A illustrates object testing against screen regions when multiple GPUs collaborate to render a single image, in accordance with one embodiment of the present disclosure. As previously described, the pieces of geometry can be objects, such that the pieces correspond to the geometry used by or generated by a corresponding draw call. During testing, object 810 may be determined to overlap region 820A. That is, portion 810A of object 810 overlaps region 820A. In that case, GPU-A is tasked to render object 810. Also, during testing object 810 may be determined to overlap region 820B. That is, portion 810B of object 810 overlaps region 820B. In that case, GPU-B is also tasked to render object 810.

FIG. 8B illustrates testing of portions of an object against screen regions when multiple GPUs collaborate to render a single image, in accordance with one embodiment of the present disclosure. That is, the pieces of geometry can be portions of objects. For example, object 810 may be split into pieces, such that the geometry used by or generated by a draw call is subdivided into smaller pieces of geometry. In one embodiment, the pieces of geometry are each roughly the size for which the position cache and/or parameter cache are allocated. In that case, the information (e.g. hint or hints) are generated for those smaller pieces of geometry, wherein the information is used by the rendering GPU, as previously described.

For example, object 810 is split into objects, such that the pieces of geometry used for region testing and hinting corresponds to these smaller objects. As shown, object 810 is split into pieces of geometry "a", "b", "c", "d", "e", and "f". After region testing, GPU-A renders only pieces of geometry "a", "b", "c", "d", and "e". That is, GPU-A can skip rendering piece of geometry "f". Also, after region testing, GPU-B renders only pieces of geometry "d," "e", and "f." That is, GPU-B can skip rendering pieces of geometry "a", "b", and "c".

In one embodiment, as the geometry processing stage is configured to perform both vertex processing and primitive processing, it is possible to perform the test of a piece of geometry in the shaders used in the geometry processing stage. For example, the geometry processing stage generates the information (e.g. hint), such as by testing a bounding frustum for the geometry against GPU screen regions, that may be performed by software shader operations. In one embodiment, this test is accelerated through the use of a dedicated instruction or instructions implemented through hardware, thereby implementing a software/hardware solution. That is, the dedicated instruction or instructions is used to accelerate the generation of the information regarding the piece of geometry and its relation to screen regions. For example, the homogeneous coordinates of the vertices of the primitive of a piece of geometry are provided as inputs to the instruction for region testing in the geometry processing stage. The testing may generate a Boolean return value for each GPU that indicates whether or not the primitive overlaps any screen regions (e.g. in a corresponding set) assigned to that GPU. As such, the information (e.g. hint) regarding the corresponding piece of geometry and its relation to screen regions is generated by shaders in the geometry processing stage.

In another embodiment, the test of a piece of geometry can be performed in a hardware rasterization stage. For example, a hardware scan converter may be configured to perform multi-GPU region testing. In particular, because the GPU must test the geometry against its own screen regions, the hardware may be modified so that a scan converter generates information for the other GPUs' screen regions. As such, the hardware scan converter may be configured to generate in the rasterization stage information regarding the corresponding piece of geometry and its relation to screen regions for which the rendering GPU (e.g., another GPU) has responsibility.

In still another embodiment, the pieces of geometry can be primitives. That is, the portions of objects used for region testing may be primitives. As such, the information generated as a hint by one GPU indicates whether or not individual triangles (e.g. representing primitives) need to be rendered by another rendering GPU.

In one embodiment, the information provided as a hint includes a number of primitives (e.g. a surviving primitive count) that overlap the screen regions (e.g. in a corresponding set) that are assigned to a corresponding GPU for object rendering. The information may also include the number of vertices used for building or defining those primitives. That is, the information includes a surviving vertex count. As such, when rendering the corresponding rendering GPU may use the supplied vertex count to allocate space in the position cache and parameter cache. For example, vertices that are not needed do not have any allocated space, which may increase the efficiency of rendering, in one embodiment.

In other embodiments, the information provided as a hint includes the specific primitives (e.g. surviving primitives as an exact match) that overlap a screen regions (e.g. in a corresponding set) assigned to the corresponding GPU for object rendering. That is, the information generated for the rendering GPU includes a specific set of primitives for rendering. The information may also include the specific vertices used for building or defining those primitives. That is, the information generated for the rendering GPU includes a specific set of vertices for rendering. This information may, for example, save the other rendering GPU time during its geometry processing stage when rendering the piece of geometry.

In still other embodiments, there may be processing overhead (either software or hardware) associated with generating the information. In that case, it may be beneficial to skip generating information as hints for certain pieces of geometry. That is, information provided as hints is generated for certain objects but not for others. For example, a piece of geometry (e.g., an object or portions of the object) that represents a skybox or a large piece of terrain may include triangles that are large. In that case, it is likely that each GPU used for multi-GPU rendering of an image or each of one or more images in a sequence of images will need to render those pieces of geometry. That is, the information may be generated or not generated depending on the properties of the corresponding piece of geometry.

FIGS. 9A-9C illustrates various strategies for assigning screen regions to corresponding GPUs when multiple GPUs collaborate to render a single image, in accordance with one embodiment of the present disclosure. To achieve GPU processing efficiency various techniques may be used when dividing the screen into regions, such as increasing or decreasing the number of regions (e.g., to choose the correct amount of regions), interleaving regions, increasing or decreasing the number of regions for interleaving, selecting a particular pattern when interleaving regions, etc. For instance, the multiple GPUs are configured to perform multi-GPU rendering of geometry for application by region testing while rendering objects in a corresponding image. The configuration of screen regions in FIGS. 9A-9C is designed to reduce any imbalance of rendering time between the plurality of GPUs. The complexity of the test (e.g. overlap a corresponding screen region) varies depending on how the screen regions are assigned to GPUs. As shown in the diagrams shown in FIGS. 9A-9C, the bold box 910 is the outline of a corresponding screen or display used when rendering the image.

In one embodiment, each of the plurality of screen regions or plurality of regions is uniformly sized. In one embodiment, each of the plurality of screen regions is not uniform in size. In still another embodiment, the number and sizing of a plurality of screen regions changes dynamically.

In particular, FIG. 9A illustrates a straightforward pattern 900A for screen 910. Each of the screen regions is uniformly sized. For example, the size of each of the regions may be a rectangle of a dimension that is a power of 2 pixels. For example, each region may be 256×256 pixels in size. As shown, the region assignment is a checkerboard pattern, with one row of A and B regions alternated with another row of B and C regions. The pattern 900A may be easily tested. However, there may be some rendering inefficiencies. For example, the screen area assigned to each GPU is substantially different (i.e., there is less coverage for screen region C and region D in screen 910), which may lead to an imbalance in the rendering time for each GPU.

FIG. 9B illustrates pattern 900B of screen regions for screen 910. Each of the screen or sub regions is uniformly sized. The screen regions are assigned and distributed so as to reduce the imbalance of rendering time between the GPUs. For example, assignment of GPUs to screen regions in pattern 900B results in nearly equal amounts of screen pixels assigned to each GPU across screen 910. That is, the screen regions are assigned to GPUs in such a way as to equalize screen area or coverage in screen 910. For example, if each region is 256×256 pixels in size, each of the regions have approximately the same coverage in screen 910. In particular, the set of screen regions A covers an area 6×256× 256 pixels in size, the set of screen regions B covers an area 5.75×256×256 pixels in size, the set of screen regions C covers an area 5.5×256×256 pixels in size, and the set of screen regions D covers an area 5.5×256×256 pixels in size.

FIG. 9C illustrates pattern 900C of screen regions for screen 910. Each of the screen regions is not uniform in size. That is, screen regions for which GPUs are assigned responsibility for rendering objects may not be uniform in size. In particular, screen 910 is divided such that each GPU is assigned to an identical number of pixels. For example, if a 4K display (3840×2160) were to be divided equally into four regions vertically, then each region would be 520 pixels tall. However, typically GPUs perform many operations in 32×32 blocks of pixels, and 520 pixels is not a multiple of 32 pixels. As such, pattern 900C may include blocks that are at a height of 512 pixels (a multiple of 32), and other blocks that are at a height of 544 pixels (also a multiple of 32), in one embodiment. Other embodiments may use differently sized blocks. Pattern 900C shows equal amounts of screen pixels assigned to each GPU, by using non-uniform screen regions.

In still another embodiment, the needs of the application when performing rendering of images change over time, and the screen regions are chosen dynamically. For example, if it is known that most of the rendering time is spent on the lower half of the screen, then it would be advantageous to assign regions in such a way that nearly equal amounts of screen pixels in the lower half of the display are assigned to each GPU used for rendering the corresponding image. That is, the regions assigned to each of the GPUs used for rendering the corresponding image may be changed dynamically. For instance, the changes may be applied based on game modes, different games, size of screen, pattern chosen for the regions, etc.

FIG. 10A is a diagram illustrating multi-pass rendering when performing multi-GPU rendering of geometry for an application by region testing while rendering, in accordance with one embodiment of the present disclosure. The first pass performed by each of the GPUs (GPU-A, GPU-B, GPU-C, and GPU-D) is Z-only pre-pass 1000A, and is similar to the rendering timing diagram 700C-2 of FIG. 7C. The first pass may be considered as a first phase of rendering. The second pass performed by each of the GPUs is a rendering pass 1000B, wherein GPUs fully render objects with consideration of internal hints generated and used by each corresponding GPU. The second pass may be considered as a second phase of rendering.

In particular, information for pieces of geometry generated in one phase (e.g. first pass) of rendering is used in another phase (e.g., second pass) of rendering. That is, an internal hint generated for one phase of rendering by a GPU is used in another phase of rendering by the same GPU. As such, the same piece of geometry is processed twice: once in a Z-only pre-pass phase 1000A and once in a full render phase 1000B. Specifically, the pre-pass phase 1000A writes only the Z value for all pieces of geometry. Then during the full rendering phase 1000B, the pixel Z value is compared with the value in the Z buffer that was previously stored, as previously described. In one implementation, if there is an exact match, the pixel shader (e.g., pixel processing stage) is executed for that pixel.

Unlike FIG. 7C where a GPU generates information for other GPUs, in this case the GPU may also be generating information for itself for use in the next pass. That is, a GPU uses its own information, such that the GPU provides a hint for itself to be used in the next pass. Though it is useful to know if the piece of geometry overlaps at least one corresponding screen region that it is responsible for (as previously described in FIG. 7C), it is possible for the GPU to generate more extensive information that can be used by itself in a later phase of rendering, in some embodiments.

In one embodiment, during the Z-only pre-pass 1000A, the corresponding GPU rasterizes the primitives output by the geometry processing phase, and performs a depth test. In the depth test, the GPU compares the Z value of their pixels with the corresponding Z buffer. The GPU generates (and makes available for itself later) the information as to whether any pixels in the piece of geometry survived the depth test during the first phase. If no pixels survived the test in the first phase, then all rendering of the piece of geometry can be skipped in the second phase.

In another embodiment, during the Z-only pre-pass phase 1000A, a pixel shader is executed. For example, the alpha value of a texture is checked, and then pixels are killed for which the alpha value is too low. In particular, the GPU generates (and makes available for itself later) the information as to whether any pixels in the piece of geometry were written during the first phase, such that those pixels survive both the depth test and the pixel kill test. If no pixels were written in the first phase 1000A, then all rendering of the piece of geometry can be skipped in the second phase 1000B. For example, an arrow 1020 shows GPU-C passing information regarding object 3 to itself. The information indicates that rendering of object 3 can be skipped by GPU-C in the full render phase 1000B. In addition, an arrow 1030 shows GPU-D passing information regarding object 1 to itself. The information indicates that rendering of object 1 can be skipped by GPU-D in the full render phase 1000B. Note that this example focuses on a GPU passing information generated in one phase (e.g. the Z-only pre-pass phase 1000A) to itself for use in a subsequent phase (e.g. the full render phase 1000B); in other embodiments, the GPU may pass the information generated in one phase (e.g. the Z-only pre-pass phase 1000A) to other GPUs as well, so that they may use in a subsequent phase (e.g. the full render phase 1000B).

Figure 10B:
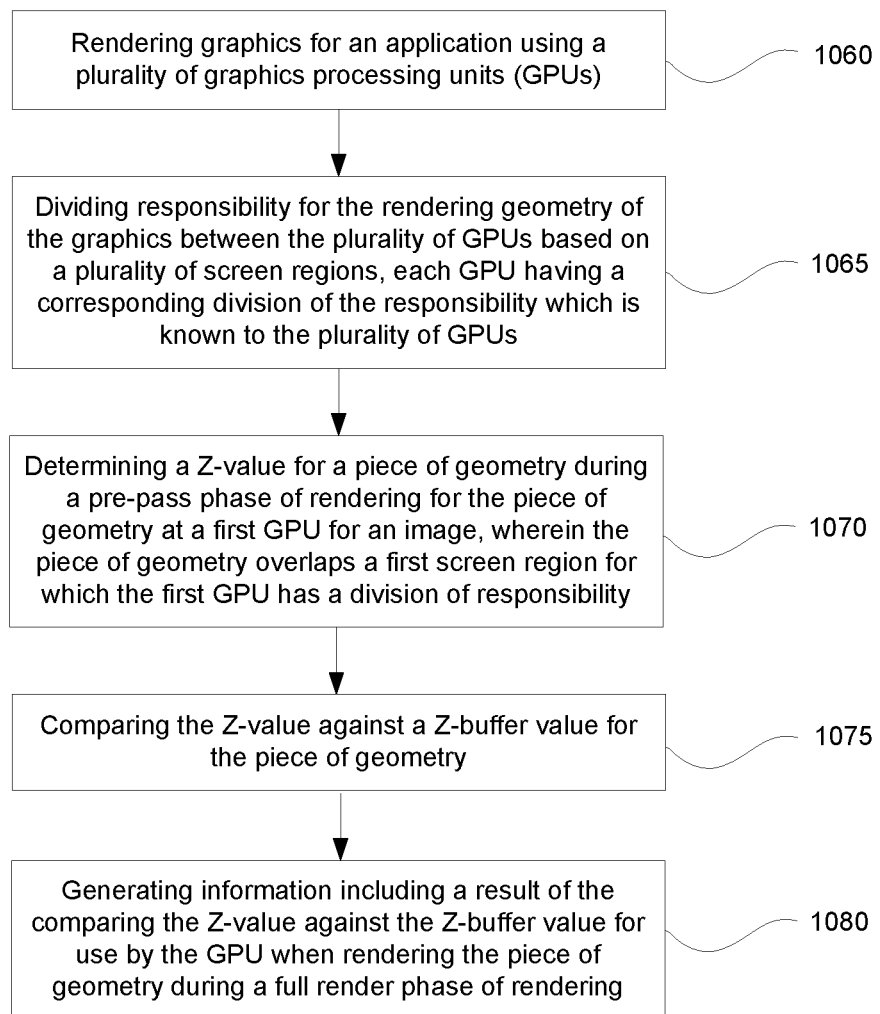
FIG. 10B is a flow diagram illustrating a method for graphics processing including performing a Z-only prepass phase of rendering for later use by the same GPU when rendering, in accordance with one embodiment of the present disclosure.

With the detailed description of the cloud game network 190 (e.g. in the game server 160) and the GPU resources 365 of FIGS. 1-3, as well as the supporting descriptions accompanying FIGS. 4-9, flow diagram 1050 of FIG. 10B illustrates a method for graphics processing including multi-pass rendering when implementing multi-GPU rendering of geometry for an application by region testing while rendering, in accordance with one embodiment of the present disclosure. Flow diagram 1050 is a method for implementing the multi-pass rendering shown in FIG. 10A, in one embodiment. In addition, flow diagram 1050 may incorporate one or more of the operations of flow diagram 500 of FIG. 5. As previously described, various architectures may include multiple GPUs collaborating to render a single image by performing multi-GPU rendering of geometry for an application through region testing while rendering, such as within one or more cloud gaming servers of a cloud gaming system, or within a stand-alone system, such as a personal computer or gaming console that includes a high-end graphics card having multiple GPUs, etc.

At 1060, the method includes rendering graphics for an application using a plurality of GPUs that collaborate to generate an image. Specifically, multi-GPU processing is performed when rendering a single image and/or each of one or more images of a sequence of images for a real-time application.

At 1065, the method includes dividing responsibility for the rendering geometry of the graphics between the plurality of GPUs based on a plurality of screen regions. That is, each GPU has a corresponding division of the responsibility (e.g. corresponding screen region) which is known to all the GPUs.

Each of the GPUs perform multi-pass rendering of the geometry of the image, including a first pass that is a Z-only pre-pass phase of rendering, and a second pass that is a full render phase of rendering. Information for a piece of geometry generated in the first pass by a GPU may be used in the second pass when rendering the piece of geometry by the same GPU.

More specifically, at 1070 the method includes determining a Z-value for a piece of geometry during a pre-pass phase of rendering for the piece of geometry at a GPU for an image. It may be determined that the piece of geometry overlaps a screen region for which the GPU has a division of responsibility for rendering objects.

At 1075, the method includes comparing the Z-value against a Z-buffer value for the piece of geometry. As previously described, the GPU may rasterize the primitives for the piece of geometry (e.g. convert the primitives into a raster image composed of pixels). A depth test is performed, wherein the Z values of the pixels of the piece of geometry is compared to a corresponding Z-buffer value (e.g. value stored therein). For example, when comparing it may be determined that the Z-value of the piece of geometry is less than or equal to the Z-buffer value, which indicates that the piece of geometry is not occluded. In that case, any information that is generated below may indicate the piece of geometry is not occluded.

At 1080, the method includes generating information including a result of the comparing the Z-value against the Z-buffer value for use by the GPU when rendering the piece of geometry during a full render phase of rendering. Specifically, the information may indicate whether any pixels in the piece of geometry survived the depth test. If no pixels survived the depth test, then the piece of geometry can be skipped in the second pass (e.g. rendering phase). For example, the method may include rasterizing into a plurality of pixels one or more primitives of the piece of geometry during the pre-pass phase. The depth test is performed by comparing a plurality of Z-values for the plurality of pixels against one or more corresponding Z-buffer values, wherein results of the depth test is included in the information. Pixels in the plurality of pixels that do not survive the depth test based on the information are not rendered. In one implementation, rendering of the piece of geometry may be skipped when none of the plurality of pixels survive the depth test. On the other hand, if any pixel in the piece of geometry survived the depth test, then the piece of geometry is rendered by the GPU in the second pass (e.g. rendering pixels that survive the depth test).

In still another embodiment, the method may include rasterizing into a plurality of pixels one or more primitives of the piece of geometry during the pre-pass phase. An alpha value of a texture for the plurality of pixels is checked. Pixels are killed in the plurality of pixels having alpha values that are below a threshold, such that results of the checking are included in the information. In one implementation, rendering of the piece of geometry may be skipped when none of the plurality of pixels have a corresponding alpha value that is at or above the threshold.

In some embodiments, the GPU is also generating information regarding the piece of geometry and its relation to the screen regions for which other GPUs are responsible, and this information is used in a subsequent phase (e.g. the full render phase of rendering). In yet other embodiments, no information is generated by comparing Z-values against the Z-buffer, instead the GPU is only generating information regarding the piece of geometry and its relation to the screen regions for which all GPUs (including itself) are responsible, and this information is used in a subsequent phase (e.g. the full render phase of rendering).

Figure 11:
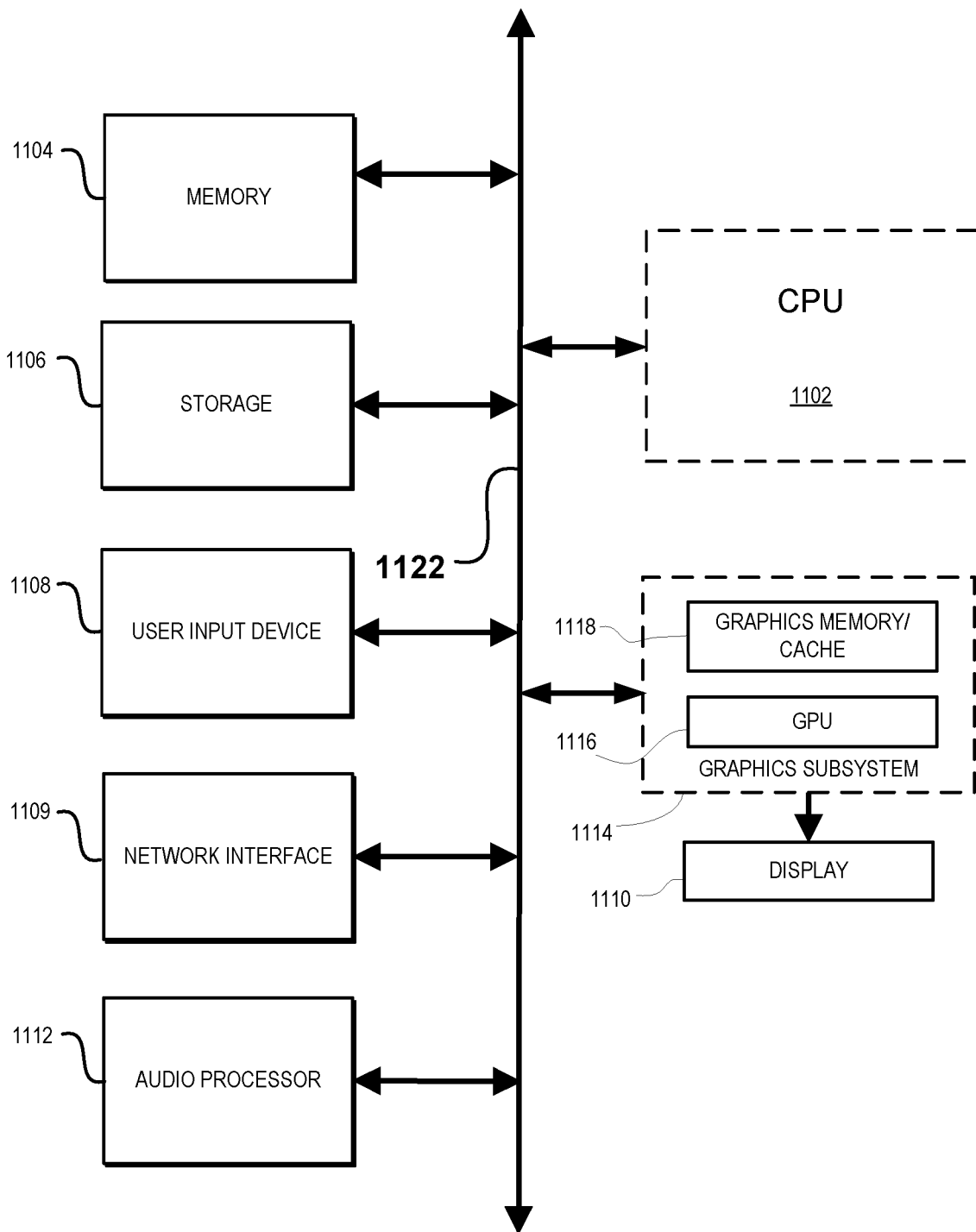
FIG. 11 illustrates components of an example device that can be used to perform aspects of the various embodiments of the present disclosure.

FIG. 11 illustrates components of an example device 1100 that can be used to perform aspects of the various embodiments of the present disclosure. For example, FIG. 11 illustrates an exemplary hardware system suitable for multi-GPU rendering of geometry for an application by region testing while rendering of objects for an image, in accordance with embodiments of the present disclosure. This block diagram illustrates a device 1100 that can incorporate or can be a personal computer, a server computer, gaming console, mobile device, or other digital device, each of which is suitable for practicing an embodiment of the invention. Device 1100 includes a central processing unit (CPU) 1102 for running software applications and optionally an operating system. CPU 1102 may be comprised of one or more homogeneous or heterogeneous processing cores.

In accordance with various embodiments, CPU 1102 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

Memory 1104 stores applications and data for use by the CPU 1102 and GPU 1116. Storage 1106 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1108 communicate user inputs from one or more users to device 1100, examples of which may include keyboards, mice, joysticks, touch pads, touch screens, still or video recorders/cameras, and/or microphones. Network interface 1109 allows device 1100 to communicate with other computer systems via an electronic communications network, and may include wired or wireless communication over local area networks and wide area networks such as the internet. An audio processor 1112 is adapted to generate analog or digital audio output from instructions and/or data provided by the CPU 1102, memory 1104, and/or storage 1106. The components of device 1100, including CPU 1102, graphics subsystem including GPU 1116, memory 1104, data storage 1106, user input devices 1108, network interface 1109, and audio processor 1112 are connected via one or more data buses 1122.

A graphics subsystem 1114 is further connected with data bus 1122 and the components of the device 1100. The graphics subsystem 1114 includes at least one graphics processing unit (GPU) 1116 and graphics memory 1118. Graphics memory 1118 includes a display memory (e.g. a frame buffer) used for storing pixel data for each pixel of an output image. Graphics memory 1118 can be integrated in the same device as GPU 1116, connected as a separate device with GPU 1116, and/or implemented within memory 1104. Pixel data can be provided to graphics memory 1118 directly from the CPU 1102. Alternatively, CPU 1102 provides the GPU 1116 with data and/or instructions defining the desired output images, from which the GPU 1116 generates the pixel data of one or more output images. The data and/or instructions defining the desired output images can be stored in memory 1104 and/or graphics memory 1118. In an embodiment, the GPU 1116 includes 3D rendering capabilities for generating pixel data for output images from instructions and data defining the geometry, lighting, shading, texturing, motion, and/or camera parameters for a scene. The GPU 1116 can further include one or more programmable execution units capable of executing shader programs.

The graphics subsystem 1114 periodically outputs pixel data for an image from graphics memory 1118 to be displayed on display device 1110, or to be projected by a projection system (not shown). Display device 1110 can be any device capable of displaying visual information in response to a signal from the device 1100, including CRT, LCD, plasma, and OLED displays. Device 1100 can provide the display device 1110 with an analog or digital signal, for example.

Other embodiments for optimizing the graphics subsystem 1114 could include multi-GPU rendering of geometry for an application by region testing while rendering of objects for an image. The graphics subsystem 1114 could be configured as one or more processing devices.

For example, the graphics subsystem 1114 may be configured to perform multi-GPU rendering of geometry for an application by region testing while rendering, wherein multiple graphics subsystems could be implementing graphics and/or rendering pipelines for a single application, in one embodiment. That is, the graphics subsystem 1114 includes multiple GPUs used for rendering an image or each of one or more images of a sequence of images when executing an application.

In other embodiments, the graphics subsystem 1114 includes multiple GPU devices, which are combined to perform graphics processing for a single application that is executing on a corresponding CPU. For example, the multiple GPUs can perform multi-GPU rendering of geometry for an application by region testing while rendering of objects for an image. In other examples, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g. if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g. a first shader operation) and compositing of outputs from slave GPU 2 and slave GPU 3, wherein slave GPU 2 could perform a second shader (e.g. fluid effects, such as a river) operation, the slave GPU 3 could perform a third shader (e.g. particle smoke) operation, wherein master GPU 1 composites the results from each of GPU 1, GPU 2, and GPU 3. In that manner, different GPUs can be assigned to perform different shader operations (e.g. flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, the present disclosure describes methods and systems configured for multi-GPU rendering of geometry for an application by region testing while rendering of objects for an image or each of one or more images in a sequence of images when executing an application.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for graphics processing, comprising:
dividing responsibility for rendering between a first GPU and a second GPU based on a plurality of screen regions, wherein the first GPU is responsible for a first screen region, wherein the second GPU is responsible for a second screen region;
loading a rendering command buffer with a plurality of commands for rendering an image frame;
rendering a first object by the first GPU using the plurality of commands;
determining that the first object does not overlap the second screen region during the rendering of the first object by the first GPU;
generating a hint by the first GPU indicating that the second GPU can entirely skip rendering of the first object;
delivering the hint from the first GPU to the second GPU; and
skipping the rendering of the first object at the second GPU when the hint is received before the second GPU begins the rendering of the first object.

2. The method of claim 1, wherein the rendering the first object by the first GPU includes:
performing the rendering of the first object in a phase of rendering that is executed by a set of commands from the plurality of commands,
wherein the first GPU and the second GPU execute the set of commands from the rendering command buffer during the phase of rendering.

3. The method of claim 2,
wherein the first GPU and the second GPU share the rendering command buffer when rendering the image frame.

4. The method of claim 1, wherein the determining that the first object does not overlap the second screen region includes:
testing the first object for overlap of the first screen region and the second screen region during a geometry processing stage of a graphics pipeline at the first GPU.

5. The method of claim 4, further comprising:
determining that the first object overlaps the first screen region; and executing to completion the rendering of the first object by the first GPU.

6. The method of claim 4, further comprising:
determining that the first object does not overlap the first screen region; and
halting execution of the rendering of the first object by the first GPU.

7. The method of claim 1, wherein the skipping the rendering of the first object at the second GPU includes:
skipping each of a plurality of stages in a graphics pipeline.

8. The method of claim 1, further comprising:
fully rendering a second object by the second GPU using the plurality of commands simultaneous with the rendering of the first object by the first GPU,
wherein the first GPU has previously determined that the second object does not overlap the first screen region such that the first GPU halts execution of the rendering of the second object.

9. The method of claim 1, further comprising:
fully rendering a second object at the second GPU when the hint is received after the rendering of the second object at the second GPU begins.

10. A non-transitory computer-readable medium storing a computer program for graphics processing, the computer-readable medium comprising:
program instructions for dividing responsibility for rendering between a first GPU and a second GPU based on a plurality of screen regions, wherein the first GPU is responsible for a first screen region, wherein the second GPU is responsible for a second screen region;
program instructions for loading a rendering command buffer with a plurality of commands for rendering an image frame;
program instructions for rendering a first object by the first GPU using the plurality of commands;
program instructions for determining that the first object does not overlap the second screen region during the rendering of the first object by the first GPU;
program instructions for generating a hint by the first GPU indicating that the second GPU can entirely skip rendering of the first object;
program instructions for delivering the hint from the first GPU to the second GPU; and
program instructions for skipping the rendering of the first object at the second GPU when the hint is received before the second GPU begins the rendering of the first object.

11. The non-transitory computer-readable medium of claim 10, wherein the program instructions for rendering the first object by the first GPU includes:
program instructions for performing the rendering of the first object in a phase of rendering that is executed by a set of commands from the plurality of commands,
wherein the first GPU and the second GPU execute the set of commands from the rendering command buffer during the phase of rendering.

12. The non-transitory computer-readable medium of claim 10, wherein the program instructions for determining that the first object does not overlap the second screen region includes:
program instructions for testing the first object for overlap of the first screen region and the second screen region during a geometry processing stage of a graphics pipeline at the first GPU.

13. The non-transitory computer-readable medium of claim 12, further comprising:

program instructions for determining that the first object overlaps the first screen region; and
program instructions for executing to completion the rendering of the first object by the first GPU.

14. The non-transitory computer-readable medium of claim 12, further comprising:
program instructions for determining that the first object does not overlap the first screen region; and
program instructions for halting execution of the rendering of the first object by the first GPU.

15. The non-transitory computer-readable medium of claim 10, further comprising:
program instructions for fully rendering a second object by the second GPU using the plurality of commands simultaneous with the rendering of the first object by the first GPU,
wherein the first GPU has previously determined that the second object does not overlap the first screen region such that the first GPU halts execution of the rendering of the second object.

16. A computer system comprising:
a processor;
memory coupled to the processor and having stored therein instructions that, if executed by the computer system, cause the computer system to execute a method for graphics processing, comprising:
dividing responsibility for rendering between a first GPU and a second GPU based on a plurality of screen regions, wherein the first GPU is responsible for a first screen region, wherein the second GPU is responsible for a second screen region;
loading a rendering command buffer with a plurality of commands for rendering an image frame;
rendering a first object by the first GPU using the plurality of commands;
determining that the first object does not overlap the second screen region during the rendering of the first object by the first GPU;
generating a hint by the first GPU indicating that the second GPU can entirely skip rendering of the first object;
delivering the hint from the first GPU to the second GPU; and
skipping the rendering of the first object at the second GPU when the hint is received before the second GPU begins the rendering of the first object.

17. The computer system of claim 16, wherein in the method the rendering the first object by the first GPU includes:
performing the rendering of the first object in a phase of rendering that is executed by a set of commands from the plurality of commands,
wherein the first GPU and the second GPU execute the set of commands from the rendering command buffer during the phase of rendering.

18. The computer system of claim 16, wherein in the method the determining that the first object does not overlap the second screen region includes:
testing the first object for overlap of the first screen region and the second screen region during a geometry processing stage of a graphics pipeline at the first GPU.

19. The computer system of claim 18, the method further comprising:
determining that the first object does not overlap the first screen region; and
halting execution of the rendering of the first object by the first GPU.

20. The computer system of claim 16, the method further comprising:
fully rendering a second object by the second GPU using the plurality of commands simultaneous with the rendering of the first object by the first GPU,
wherein the first GPU has previously determined that the second object does not overlap the first screen region such that the first GPU halts execution of the rendering of the second object.

* * * * *